US006880758B2

(12) United States Patent
Park et al.

(10) Patent No.: US 6,880,758 B2
(45) Date of Patent: Apr. 19, 2005

(54) SYSTEM AND METHOD FOR IDENTIFYING OBJECT INFORMATION

(75) Inventors: Moon Sung Park, Daejeon (KR); Yun Su Chung, Daejeon (KR); Byeong Woon Jin, Daejeon (KR); Yong Joon Lee, Daejeon (KR); Jin Suk Kim, Daejeon (KR); In Soo Kim, Daejeon (KR); Hye Kyu Kim, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 81 days.

(21) Appl. No.: 10/329,385

(22) Filed: Dec. 27, 2002

(65) Prior Publication Data

US 2003/0127518 A1 Jul. 10, 2003

(30) Foreign Application Priority Data

Dec. 28, 2001 (KR) ................. 10-2001-0086972

(51) Int. Cl.[7] .......................... G02B 26/10; G06K 7/10; G06K 9/22; G06K 19/06
(52) U.S. Cl. .............................. 235/462.25; 235/462.08
(58) Field of Search ....................... 235/462.01, 462.08, 235/462.02, 462.14, 462.16, 462.25, 462.41, 470, 454; 382/101

(56) References Cited

U.S. PATENT DOCUMENTS

| 5,468,945 | A | * | 11/1995 | Huggett et al. ........ 235/462.02 |
| 5,563,955 | A | * | 10/1996 | Bass et al. ................... 382/101 |
| 5,719,678 | A | * | 2/1998 | Reynolds et al. ........... 382/101 |
| 5,900,611 | A | * | 5/1999 | Hecht ......................... 235/454 |
| 6,010,070 | A | * | 1/2000 | Mizuochi et al. ....... 235/462.25 |
| 6,015,089 | A | | 1/2000 | Hecht et al. |
| 6,332,574 | B1 | * | 12/2001 | Shigekusa et al. ...... 235/462.16 |
| 6,431,447 | B1 | * | 8/2002 | Park et al. .............. 235/462.02 |
| 6,442,503 | B1 | * | 8/2002 | Bengala ..................... 702/156 |
| 6,588,665 | B1 | * | 7/2003 | Knowles et al. ........ 235/462.01 |
| 6,708,884 | B1 | * | 3/2004 | Su et al. ................. 235/462.08 |
| 6,729,544 | B1 | * | 5/2004 | Navon .................... 235/462.14 |
| 6,786,414 | B1 | * | 9/2004 | Tsikos et al. ........... 235/462.01 |
| 2001/0006191 | A1 | * | 7/2001 | Hecht et al. ............ 235/462.16 |

OTHER PUBLICATIONS

Hideki Bando, "Processing of Undeliverable mail as addressed in Japan", 13th International Conference on Postal Automation, May 23, 1999, vol. 1, pp. 1–4.

* cited by examiner

Primary Examiner—Jared J. Fureman
(74) Attorney, Agent, or Firm—Mayer, Brown, Rowe & Maw LLP

(57) ABSTRACT

In a system for identifying an object having a bar code symbology, a measurement and input unit measure a height and a length of the object and input the measured values into the system. An object image and search region image storage unit stores an image of the object and images of at least two sub blocks from the object. A search region setting unit sets a size of the sub blocks. A region of interest (ROI) generation unit sets a weight and a characteristic value of the sub block. A bar code symbology identification unit searches vertically a bar code region from the ROI and generates a bar code edge region. An information interpretation unit interprets object information corresponding to the bar code edge region. A result process and storage unit processes and stores the interpreted object information.

18 Claims, 18 Drawing Sheets

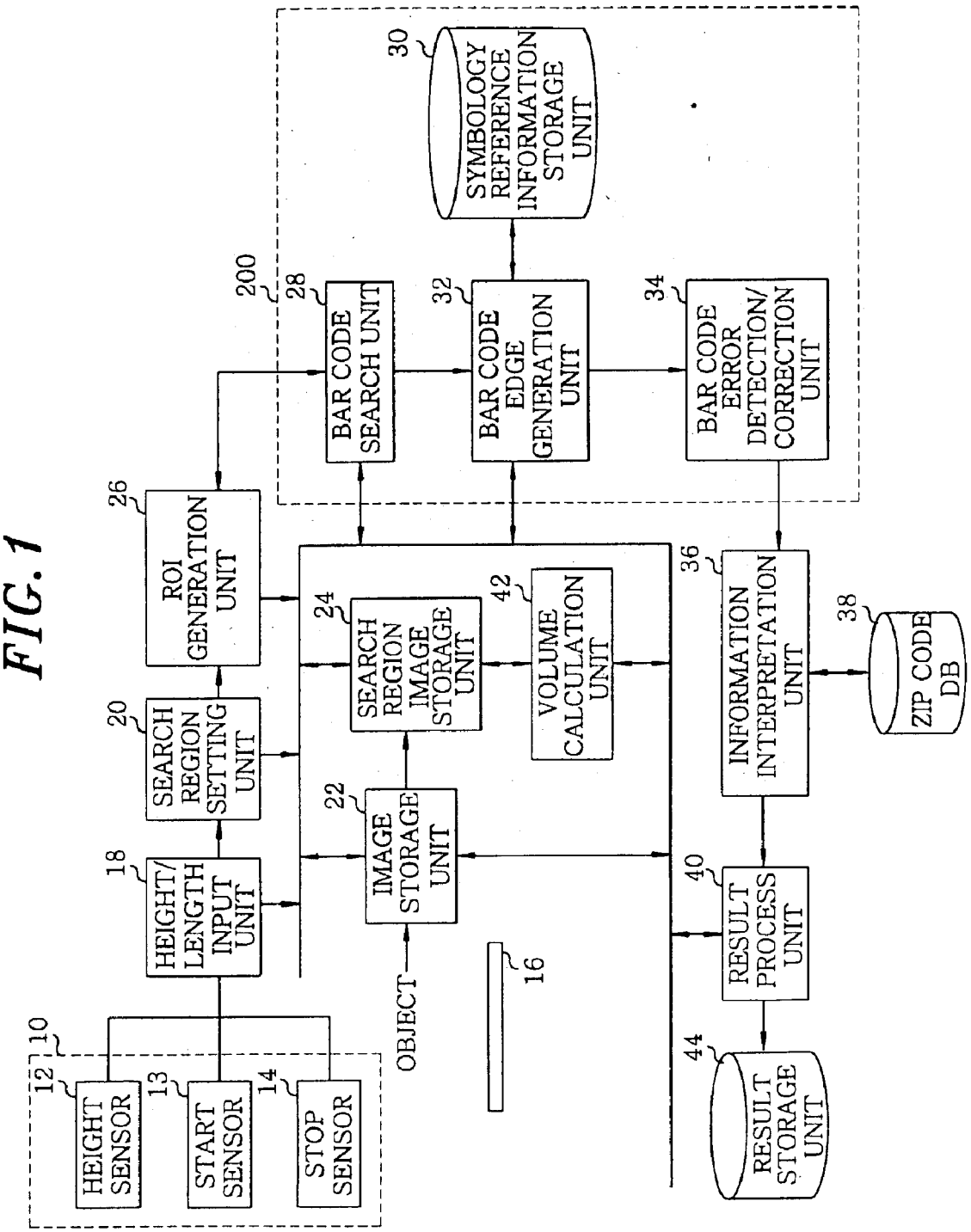

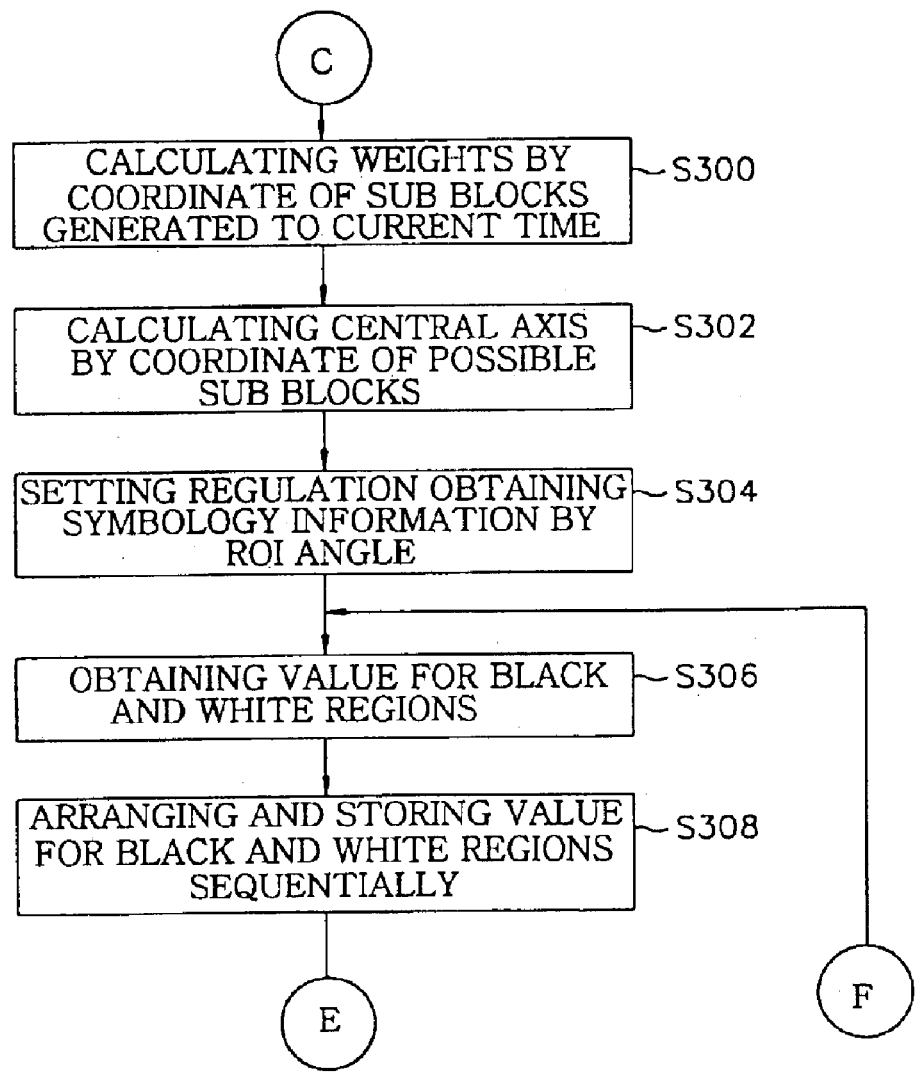

FIG. 5A
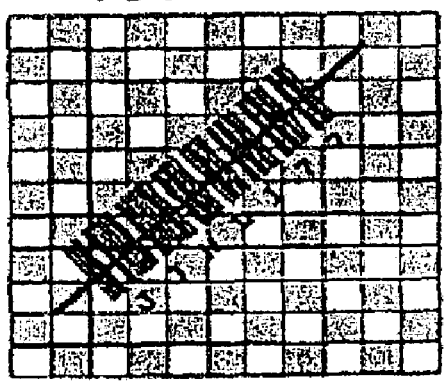
701
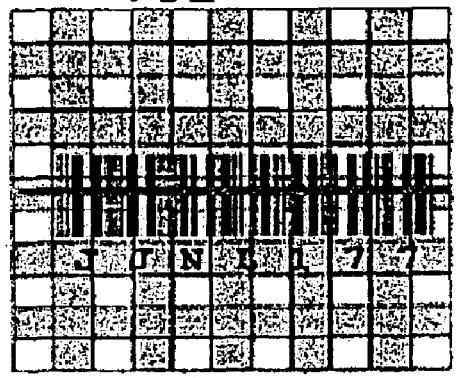
702
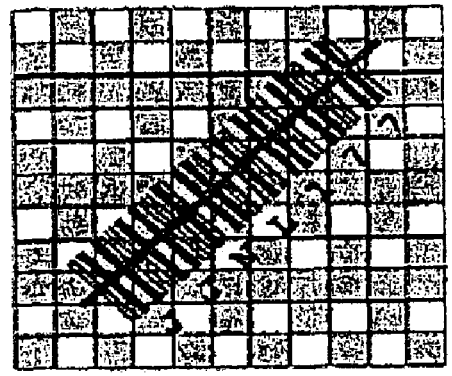
703
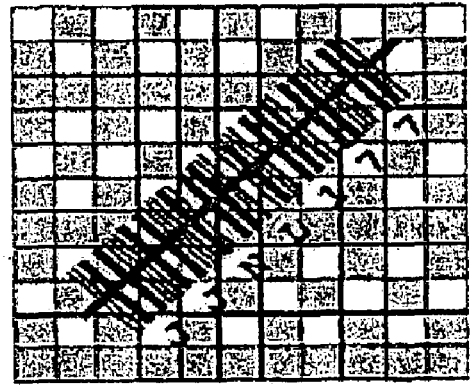
704

FIG. 5B
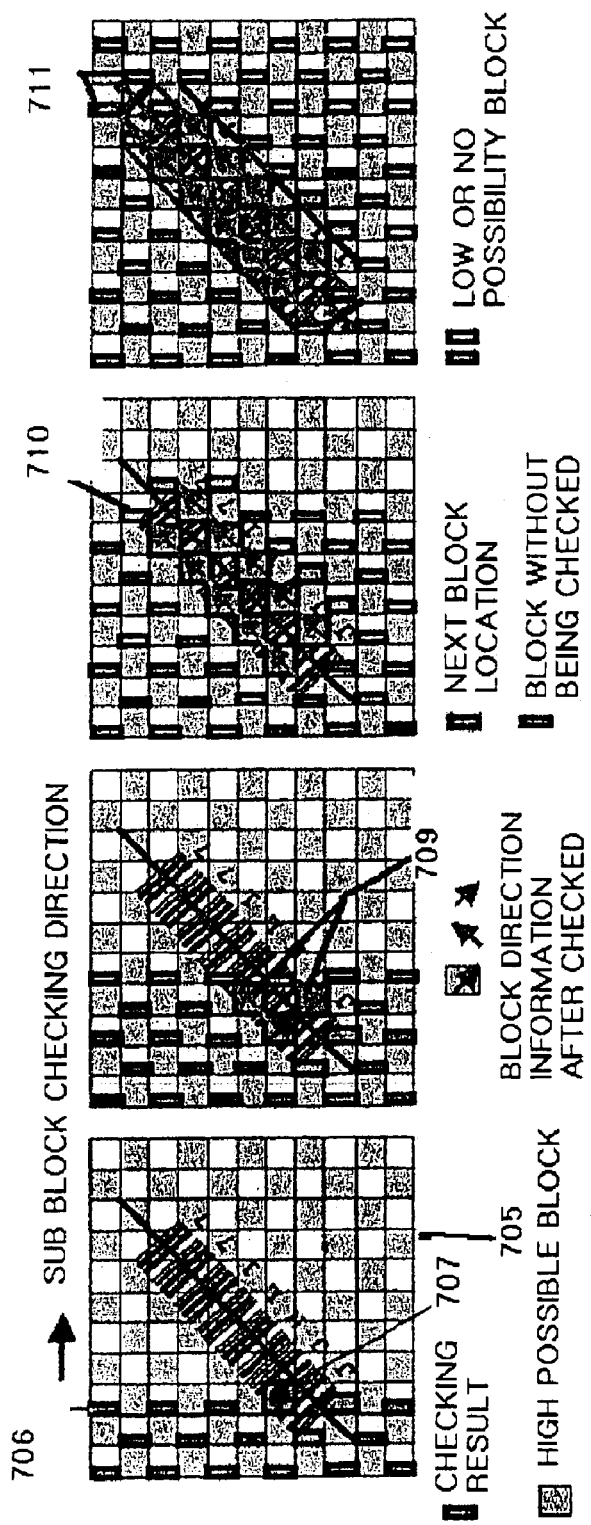
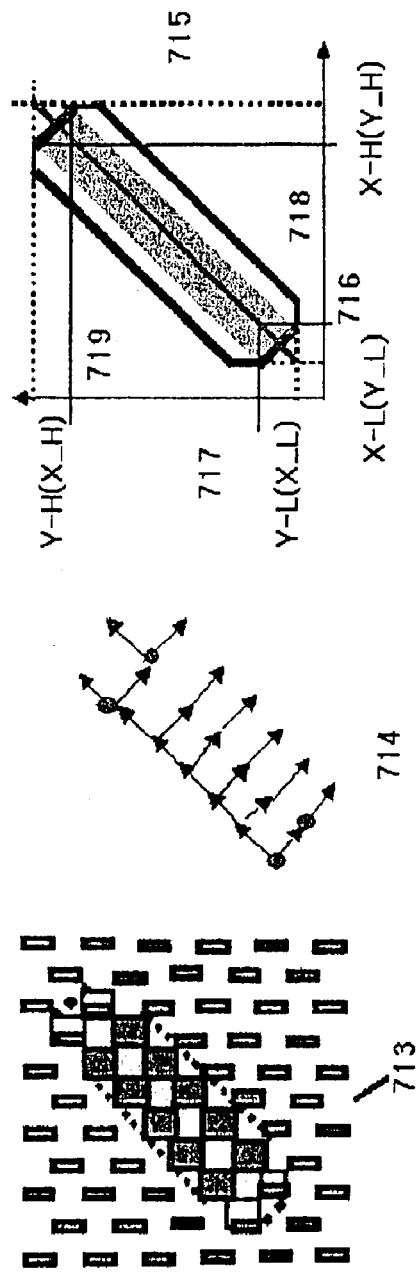

SYSTEM AND METHOD FOR IDENTIFYING OBJECT INFORMATION

FIELD OF THE INVENTION

The present invention relates to a technology for automatically identifying object information; and, more particularly, to a system and method for automatically identifying the object information while concurrently obtaining volume information of the object by dividing an image of the object into a plurality of sub blocks, extracting from every sub block a region of interest having a possibility of containing a bar code symbology (hereinafter referred to as a ROI) and searching for the bar code symbology in the extracted ROIs.

BACKGROUND OF THE INVENTION

In general, a bar code symbology identification process is performed for the purpose of classifying, transporting and delivering objects. The bar code symbology identification process involves obtaining information for automatically classifying the objects, gaining information to be recorded and managed through the use of a stop sensor and a height sensor, and automatically calculating a volume of the object based on the information attained by the stop sensor and the height sensor and a ROI search result.

Conventionally, only the information for classifying the objects has been utilized among information obtained by an image processing technique. Further, since a great amount of time is required to search for a bar code symbology by using a bar code symbology reading machine, it is very difficult to read more than one bar code symbology. In particular, in case the object has a large volume or area, it is impossible to read more than one bar code symbology.

Furthermore, a separate volume measurement system is required in the prior art in order to generate the volume information of the object while concurrently identifying the bar code symbology.

Generally, a bar code symbology reader system includes the steps of binarizing an image of the object in order to search for a bar code symbology at a high speed, extracting an edge of a black region and comparing the extracted edge with characteristic values of the bar code symbology. In case the bar code symbology declines over a predetermined angle, the bar code symbology reader system generates a central axis based on coordinates of the ROIs and examines all the ROIs to obtain a symbology pattern value. However, if a single threshold is applied in binarizing the object image, the possibility of finding a wrong bar code symbology region is very high since the threshold of the obtained image varies depending on a brightness distribution of an illumination and, thus, a bar code symbology may not satisfy even a requirement of the ROI in such case. In the mean time, even if multiple thresholds are utilized in order to overcome the above-mentioned problem, a great amount of time is required since each threshold should be applied for the whole image of the object or for searching for the ROIs of the object.

A bar code reader system using the above described technique, e.g., the bar code reader system disclosed in U.S. Pat. No. 6,193,158, performs the steps of setting a block size for the object image, generating vertical and horizontal grid lines at a predetermined distance and examining the above image in order to find bar code symbologies. However, the number of grid lines is so large that a great amount of time is consumed in order to calculate coordinate values of ROIs for the bar code symbologies existing on the vertical and the horizontal grid lines. The required time further increases since the vertical grid lines and their neighboring grid lines should be all examined in order to generate the coordinate values of the ROIs based on the examination result of the vertical grid lines. Further, if a bar code symbology declines by a certain angle, an error range of the image values obtained on the horizontal and the vertical grid lines should be estimated. In addition, if a part of character lines similar to the bar code symbology exists on the vertical or the horizontal grid lines, a number of ROIs may be wrongly selected. Moreover, if the bar code symbology has a short length or a small height, a larger number of grid lines should be generated, thus consuming a greater amount of time than in the case where the grid lines are set at a fixed interval.

In a conventional method for obtaining the bar code symbology information, the information is obtained and estimated by using a ladder structure. If the information of a to-be-read grid line overlaps with information of another grid line according to the inclination angle of the bar code symbology, however, the overlapped region should be removed.

In particular, if the grid lines are too short or too long and if a width of a bar is too narrow or too wide, a method for searching for geometry feature information of the bar, except for a curve shape, is employed in order to the ROIs of the bar code symbology. In examining the ROIs of the bar code symbology, the ROIs can be interpreted by calculating the two-dimensional information based on directional information and edges of the bar, selecting character images as ROIs in case of including a straight line component and interpreting all the image information in the ROIs.

Further, a method for checking whether a start and a stop bar region are coincident with a start and a stop pattern of to-be-read bar code symbology or with those of another bar code symbology is applied in order to identify the type and the direction property of a symbology. Thus, in case a bar code symbology, e.g., a bar code symbology contained in an international standard ISO/IEC/JTC1/SC31), not included in a system employing the above method is to be read, another identification method suitable for such a bar code symbology should be added to the image processing module. Further, since a method for verifying the state of the bar code symbology obtained as an image can be found in a decoding process and the start and the stop symbology can be also examined by the aforementioned information interpretation module, there occurs a problem that the same function is performed twice. Due to the complicated process as described so far, it is almost impossible to read more than two bar code symbologies. Further, it is also difficult to create the volume information of the object at the same time.

Furthermore, a method for setting in the decoding process three stages having a Low stage, setting a variable region in a middle stage of the three stages and calculating variations of a thickness of the bar code symbology and a value of a white region is conventionally applied in order to exactly obtain the thickness of the bar code symbology and the white region value. In this method, in order to prevent a wrong determination of the symbology value due to the brightness variation of the illumination generated by fixing a threshold value, a process for comparing ratio values of the symbology each other is included, so that it leads to a great amount of operation time. Further, though different gray level values can be applied according to their magnification, a high value with the threshold value fixed is obtained even in a narrow bar if well illuminated. Accordingly, there still exists a possibility of obtaining a wrong symbology value in case the bar code symbology is decided based on varied thickness of the bar code symbology and value of a white region or a reference value is applied as the magnification value of the narrow bar.

SUMMARY OF THE INVENTION

It is, therefore, an object of the present invention to provide a method and system for automatically identifying object information while concurrently obtaining volume information of the object by dividing an image of the object into a plurality of sub blocks, extracting from every sub block a region of interest having a possibility of containing a bar code symbology (hereinafter referred to as a ROI), and searching for the bar code symbology in the extracted ROIs.

In accordance with one aspect of the present invention, there is provided a system for identifying an object having a bar code symbology, the system including: a measurement and input unit for measuring a height and a length of the object and inputting the measured values into the system; an object image and search region image storage unit for storing an image of the object and images of at least two sub blocks divided from the image of the object and searching a region from the image of the object at certain intervals; a search region setting unit for setting a size of the sub blocks; a region of interest having a possibility of containing the bar code symbology (ROI) generation unit for checking the sub blocks to only examine a surface of the object and the possibility of contaning the bar code symbology, setting a weight on every sub block, generating a characteristic value of the sub blocks and setting the ROI; a bar code symbology identification unit for vertically searching a bar code region from the ROI based on the weight and the characteristic value of the sub blocks, searching a section corresponding to reference information on a predetermined symbology based on a central line of the bar code region and generating a bar code edge region; an information interpretation unit for interpreting object information corresponding to the bar code edge region; and a result process and storage unit for processing and storing the interpreted object information based on data of pre-stored database if the interpreted object information exists in the pre-stored database and, if otherwise, notifying the search region setting unit of no existence of the object information.

In accordance with another aspect of the present invention, there is provided a method for identifying an object having a bar code symbology, the method including the steps of: (a) measuring a height and a length of the object and storing an image of the object and images of at least two sub blocks divided from the image of the object; (b) checking the sub blocks, examining a possibility of contaning the bar code symbology, setting a weight on every sub block, generating a characteristic value of the sub blocks and setting a region of interest having a possibility of containing a bar code symbology (ROI); (c) searching in a vertical direction a bar code region from the ROI based on the weight and the characteristic value of the sub blocks, searching a section corresponding to reference information on a predetermined symbology based on a central line of the bar code region and generating a bar code edge region; (d) interpreting object information corresponding to the bar code edge region; (e) determining whether the interpreted information belongs to information for automatic classification of the object or information to be recorded and managed and verifying whether the image of a sub block of the sub blocks is the last image thereof; (f) checking a sub block next to the sub block if the image of the sub block is not the last image thereof; and (g) processing and storing a result from the information for automatic classification of the object or the information to be recorded and managed if the image of the sub block is the last image thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects and features of the present invention will become apparent from the following description of the preferred embodiment of the present invention given in conjunction with the accompanying drawings, in which:

FIG. 1 is a block diagram of an automatic object information identification system in accordance with the present invention;

FIGS. 2A to 2D provide a flowchart of an automatic object information identification process in accordance with the preferred embodiment of the present invention;

FIGS. 5A to 5C respectively illustrate a process for setting the number of sub blocks to be examined, examining the sub blocks, and obtaining a bar code symbology region in accordance with the preferred embodiment of the present invention;

DETAILED DESCRIPTION OF PREFERRED EMBODIMENTS

Figure 2A:
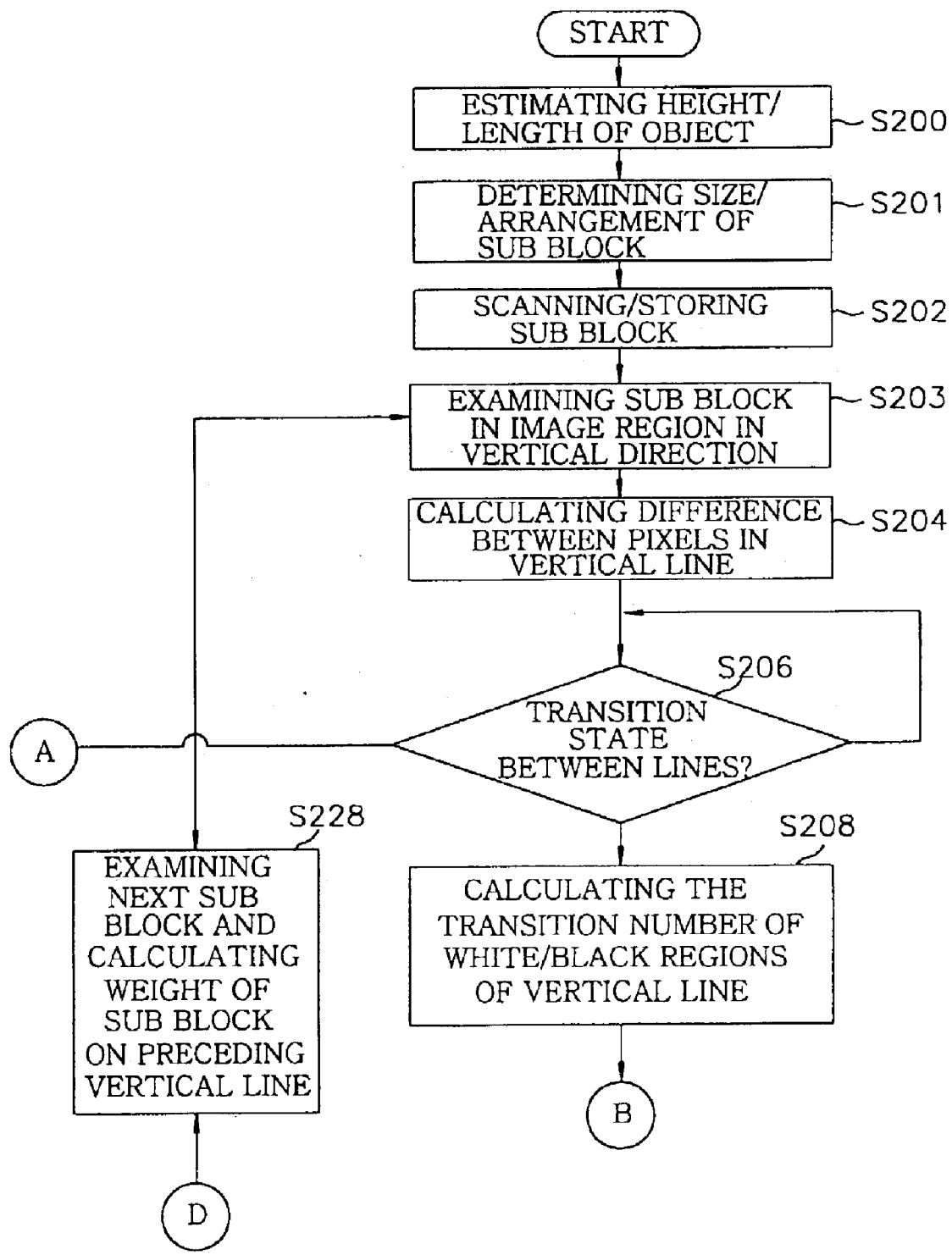

Referring to FIG. 1, there is provided a block diagram of an automatic object information identification system in accordance with the present invention.

The automatic object information identification system includes a measurement unit 10, a line scan CCD camera 16, a height/length input unit 18, a search region setting unit 20, an object image storage unit 22, a search region image storage unit 24, a ROI (region of interest: a to-be-read candidate region having a possibility of containing a bar code symbology, hereinafter referred to as ROI) generation unit 26, a bar code symbology identification (decipher) unit 200, an information interpretation unit 36, a zip code DB 38, a result process unit 40, a volume calculation unit 42 and a result storage unit 44.

The measurement unit 10 has a height sensor 12, a start sensor 13 and a stop sensor 14. If an object is delivered to the measurement unit 10 by a conveyor belt (not shown), the height sensor 12 calculates a height of the object. For example, the height sensor 12 measures the height of the object in a unit of 0.5 cm by using a trigger signal. The start sensor 13 records a starting point of the object on the conveyer belt and the stop sensor 14 detects an ending point of the object on the conveyer belt. By using data transferred from the start sensor 13 and the stop sensor 14, a length of the object can be calculated.

The line scan CCD camera 16 serves to scan an image of the object being delivered by the conveyer belt.

The height/length input unit 18 receives the height of the object measured by the height sensor 12 and the length of the object calculated by the start sensor 13 and the stop sensor 14.

The search region setting unit 20 sets a size of a sub block stored in the search region image storage unit 24. The search region setting unit 20 decides a total number of sub blocks based on the height and the length of the object provided from the height/length input unit 18, the number of the sub blocks being set to be at least two. To be more specific, the search region setting unit 20 divides the image of the object into a plurality of sub blocks in ½ or ⅓ in order to identify the object information. For example, if the image of the object has a size of 4,096×4,096 and the size of a single sub block is set to be 1,024×1,024, the total number of the sub blocks of the image is calculated as four. The number of sub blocks can be varied depending on the size of an object involved.

More specifically, the size of the sub block is determined by considering a maximum and a minimum height of the bar code symbology. In other words, the size of the sub block is set in order that a bar code symbology is included in at least two to four sub blocks. Thus the set sub block exists on the object image in a vertical direction (row) and a horizontal direction (line). The investigation of the Sub blocks is performed in a manner that the sub blocks are checked in the vertical direction in sequence.

If the image of the object being delivered on the conveyer belt is scanned on a sub block basis defined by the search region setting unit 20, the separate images of the sub blocks are stored as a single group in the object image storage unit 22, thus constructing together the whole image of the object.

The images of the sub blocks are individually stored in the search region image storage unit 24.

The ROI generation unit 26 investigates possibilities of the bar code symbology existing in the object image divided by the sub blocks stored in the search region image storage unit 24. Then, the ROI generation unit 26 sets a weight and a characteristic value for each of the sub blocks based on the investigation result to set the bar code ROIs.

In order to minimize a investigation of a sub block corresponding to a side of the object or a conveyor belt side (hereinafter referred to as a background side), the present invention provides a method for checking sub blocks existing at areas other than a left and a right side (the conveyer belt side) of the sub blocks where the edges of the object are found.

The bar code symbology identification unit 200 includes a bar code search unit 28, a symbology reference information storage unit 30, a bar code edge generation unit 32 and a bar code error detection/correction unit 34.

The bar code search unit 28 checks the bar code ROIs of the sub blocks in the vertical direction and adjusts weights for the sub blocks by the weight and the characteristic value of the ROIs. However, if the weights for the sub blocks are below a predetermined reference value even though the bar code ROIs of the sub blocks are checked in the vertical direction more than twice, a rectangular bar code region including 4 coordinates is generated by using the minimum and maximum coordinates of preceding sub blocks having high weights.

The bar code edge generation unit 32 creates a central axis line of the bar code region generated by the bar code search unit 28 and finds a section in the bar code corresponding to a start symbol and a stop symbol by using the symbology reference information stored in the symbology reference information storage unit 30. Then, the bar code edge generation unit 32 calculates the size of the bar code edge region by sequentially calculating the sum of the thickness of the bar code symbology and size values of white regions as well as the sum of size values of white regions and the symbol thickness.

The bar code error detection/correction unit 34 inspects whether character values contained in the bar code symbology are correct by using a check digit value based on the values obtained by the bar code edge generation unit 32 except the start and the stop symbols. If the inspection result shows that only one bar code symbology character has an error due to coordinate values of a damaged bar code region, the damaged bar code region being represented by a damage of a bar code image, a bar code symbology and an object, etc., the bar code error detection/correction unit 34 corrects the error of the wrong character by calculating the check digit value.

The information interpretation unit 36 interprets the object information corresponding to the bar code edge region created by the bar code symbology identification unit 200. Then, the information interpretation unit 36 determines whether the interpreted information belongs to information for automatic classification of the object (hereinafter referred to as classification information) or information to be recorded and managed (hereinafter, management information). If the object information is the classification information, the information interpretation unit 36 searches the zip code DB 38 for a zip code corresponding to an address of the object information. If the zip code exists, the information interpretation unit 36 notifies the result process unit 40 of the zip code, thereby allowing for automatic classification of the object. If there exists no appropriate address or the information is wrongly interpreted, however, the information interpretation unit 36 informs the result process unit 40 of such fact.

If the object information interpreted by the information interpretation unit 36 already exists in a pre-stored database, e.g., the zip code DB, the result process unit 40 processes the object information according to the database. In the meanwhile, if no object information exists in the pre-stored database, the result process unit 40 notifies the search region setting unit 20 of such fact and outputs, e.g., a barcode error information and a zip code error message. Then, the result storage unit 44 stores the processed result from the result process unit 40 and operates the ROI generation unit 26. Then, the ROI generation unit 26 delivers a next ROI within the current sub block or a ROI in a next sub block to the bar code symbology identification unit 200, thereby continuing the bar code identification process.

If all the sub blocks are examined by the result process unit 40, the volume calculation unit 42 estimates the volume of the object by applying an maximum height value to the area of an upper surface of the object, the upper surface being calculated based on coordinate values of corner sub blocks having a lowest weight. At this time, the volume of the object can also be calculated by using a variation amount of height and a transfer speed of the object, the variation amount of the height being measured by the height sensor 12.

Figure 2B:
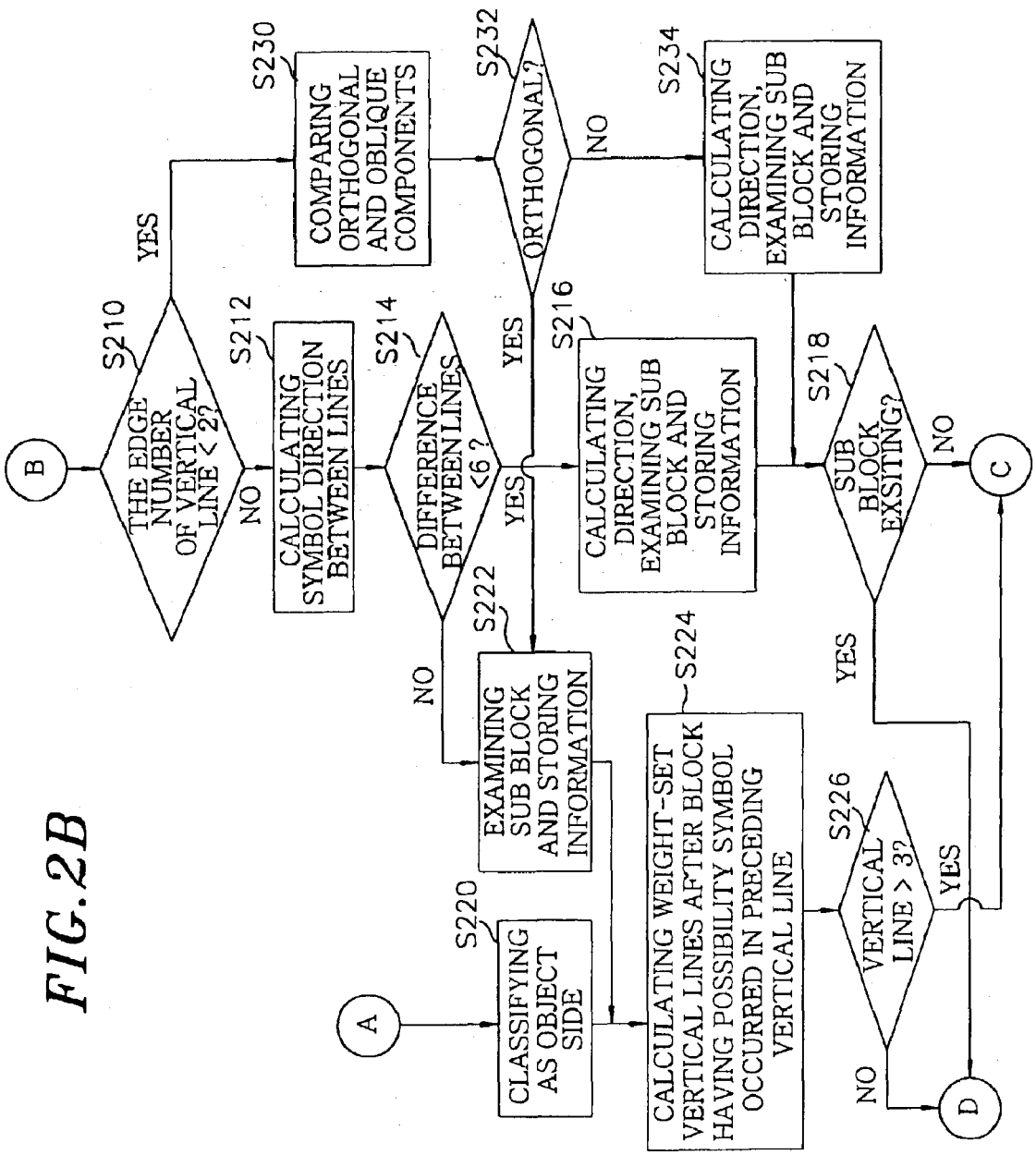
Figure 2D:
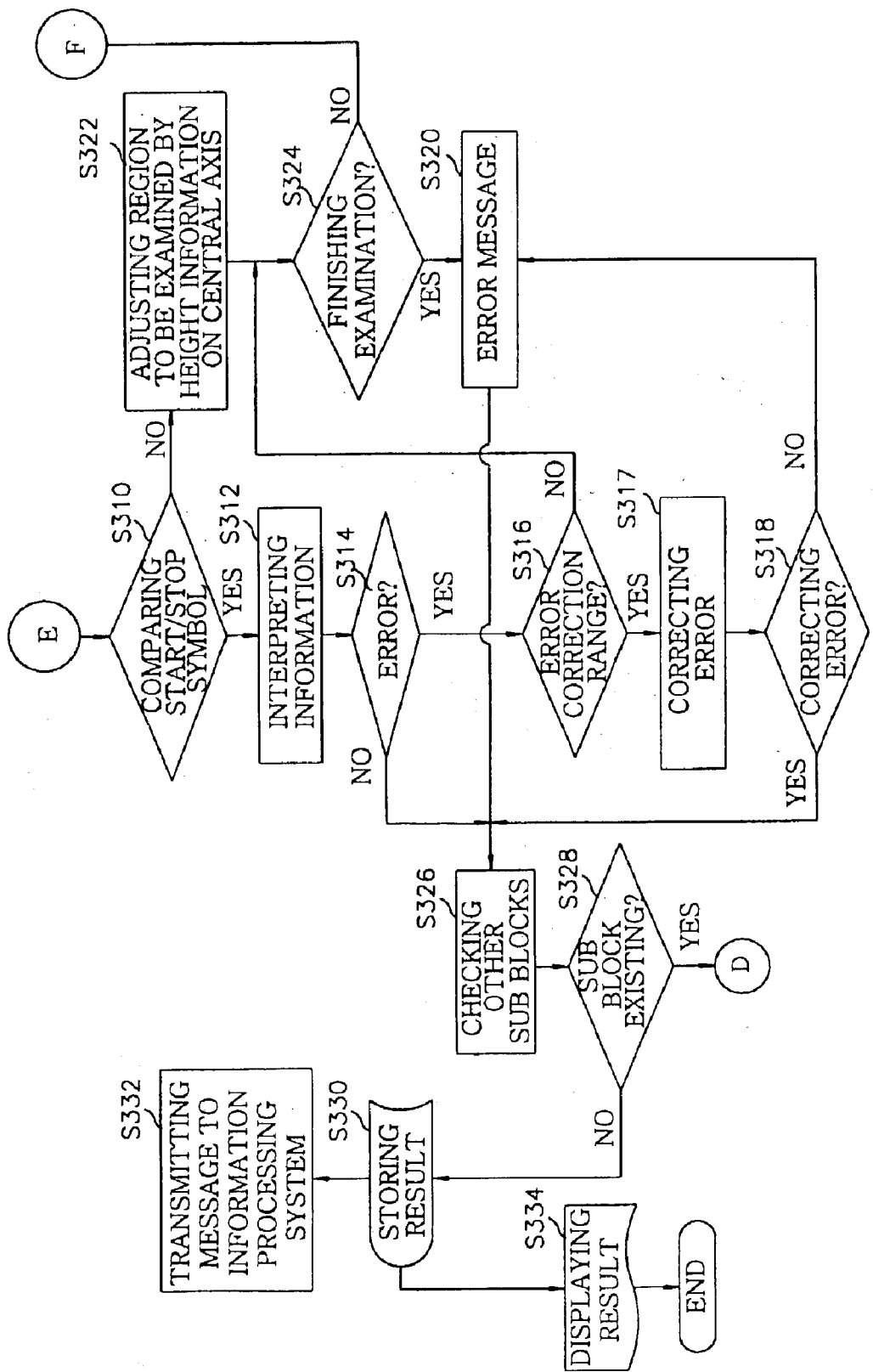

Referring to FIGS. 2A to 2D, there are provided flowcharts describing an object information automatic identification process in accordance with the preferred embodiment of the present invention. FIGS. 2A and 2B describe a process for setting and examining sub blocks of the object information and FIGS. 2C and 2D illustrate a process for identifying a bar code symbology in the examined sub blocks.

In FIGS. 2A and 2B, if the object starts to be transferred through the conveyer belt, the measurement unit 10 starts to operate so that the height sensor 12 measures the height of the object while the start and the stop sensors 13 and 14 estimate the length of the object. The obtained height value and the length value of the object are inputted to the height/length input unit 18 to be stored therein (Step 200).

The search region setting unit 20 sets the total number (a maximum of 128×128) of sub blocks obtained by dividing the image of the object in at least two (Step 201).

The line scan CCD camera 16 scans the object image by performing an image loading on a sub block basis. The scanned sub block based image data are stored in the image storage unit 24 (Step 202).

Then, the ROI generation unit 26 examines the sub blocks in order to check the possibility of the bar code symbology existing therein (Step 203). The process for examining the sub blocks is performed in steps 204 to 234 in a vertical direction. In the preferred embodiment of the present invention, the sub blocks are examined by employing a method for calculating difference values between neighboring pixels in a same vertical line. The following is a detailed description of sub block examination process in accordance with the present invention.

First, the ROI generation unit 26 calculates the difference values between the neighboring pixels in the vertical line within a sub block (Step 204) and then determines whether a transition state occurs between the neighboring lines (Step 206). If the transition state, the number of edges being transferred to a white or a black region is calculated (Step 208). Then, the ROI generation unit 26 checks whether the number of the edges is more than 2 (Step 210) and, if so, the ROI generation unit 26 calculates a difference value of a symbol direction between lines based on the size of the white and the black regions existing between the lines (Step 212). If the absolute value of the symbol direction difference is found to be less than a threshold (in case of the preferred embodiment, the threshold being set to be 6) (Step 214), the ROI generation unit 26 stores the absolute value as a direction flag value according to the symbol direction between the lines, the symbol direction including e.g., a upper 45° of an increase, 0 of same location, a lower 45° of a decrease (Step 216) Then, the ROI generation unit 26 determines whether the next sub block exists (Step 218) and performs a C or a D step depending on the determination result.

In the meanwhile, if it is determined in the step 206 that no transition state occurs between the neighboring lines, the ROI generation unit 26 classifies the sub block as the conveyer belt side and the side of the object, i.e., the background side (Step 220).

If the sub block having a high possibility of containing the bar code symbology exists on a previously examined vertical line, the ROI generation unit 26 estimates the number of vertical lines having a weight defined on the basis of the background side or the character line (Step 224). Then, the ROI generation unit 26 checks whether the number of vertical lines exceeds the threshold, e.g., 3, thus finding the possibility of containing the bar code symbology (Step 226). If it is found in the step 226 that the number of the vertical line exceeds the threshold 3, the step C is performed. However, if the number of the vertical lines is found to be less than 3, the step D is performed.

If the number of edges is found in the step 210 to be less than 2, the ROI generation unit 26 compares an orthogonal component and an oblique component of the vertical line of the sub blocks (Step 230). For example, in order to obtain the direction value in case of the oblique component, a distribution of values of a starting section (white or black region) of the vertical line in the sub block and values of an ending section thereof is compared between the vertical lines. It is determined whether, when the symbol information exists horizontally or vertically, more than two pixels of orthogonal components exist continuously or the number of edges is different from each other, thus detecting the orthogonal components.

Based on the comparison result obtained in the step 230, the ROI generation unit 26 determines whether the orthogonal component exists in the vertical line (Step 232) and if the orthogonal component is found, the ROI generation unit 26 stores the information obtained up to the current time as information of containing the possibility of a character (Step 218).

If the oblique component is found in the step 232, on the other hand, the ROI generation unit 26 includes and stores a direction value in the flag based on the distribution described in the step 230 (step 234). For example, if the starting region increases/decreases in the oblique component, it is checked whether the ending region decreases/increases, thus obtaining the direction value based on the increment or the decrement.

Next sub blocks are examined at a time when it is found in the step 218 that there exists the next sub blocks, the weights for the sub blocks examined up to the current time are operated and adjusted, and then it returns to the step 203 to examine next sub blocks (step 228).

Referring to FIGS. 2C and 2D, there is a process for extracting a bar code ROI based on the weights of the sub blocks, identifying the bar code symbology and interpreting the object information.

The ROI generation unit 26 calculates weights of the sub blocks by using coordinate values of the sub blocks generated up to the current time and creates four outer coordinates to set regions of interest (ROI) (Step 300).

The bar code search unit 28 of the bar code symbology identification unit 200 obtains a line component of a central axis based on the outer coordinates of the ROIs in order to attain bar code symbology information (Step 302) Thereafter, the bar code search unit 28 estimates an inclination angle of the ROIs generated by lengths of a long axis and a short axis of each of the ROIs and sets a rule for obtaining the bar code symbology information depending on the inclination angle (Step 304). To be more specific, the rule setting process involves the steps of: comparing the inclination angle with an angle of the central axis; scanning the line component vertically or horizontally; determining whether the bar code symbology information can be read; and obtaining a gradient of the central axis as well as start and stop coordinates by scanning a minimum path based on the bar code symbology height information if it is determined that no bar code symbology can be obtained.

The bar code edge generation unit 32 of the bar code symbology identification unit 200 calculates a thickness of the narrowest symbol and the widest symbol based on four or five thresholds for gray level values obtained by performing a scanning process defined by the rule setting process in the step 304, thereby obtaining values of the black and the white regions (Step 306). Then, the bar code edge generation unit 32 arranges the obtained values of the black and the white regions in sequence and stores the arranged values as bar code symbology information (Step 308) Then, the bar code edge generation unit 32 compares the start and the stop symbols to check whether there exist identical symbols therebetween (Step 310) and, then, obtains the edge region of the bar code by obtaining a thickness of the bar code symbology, a total size of the white regions and a sum of the bar code symbology thickness and the total size of the white regions.

The information interpretation unit 36 interprets the bar code information within the bar code edge region based on the symbology reference information (for example, Code 128, Code 39, Interleaved 2 of 5) (Step 312). The interpretation result obtained in the step 312 is then transferred to the bar code error detection/correction unit 34. The bar code error detection/correction unit 34 examines whether the interpretation result has an error therein (Step 314). If it is determined in the step 314 that there exists no error in the interpretation result, the information interpretation unit 36 searches for a next sub block (Step 326). If the next sub block is found in the step 326 (step 328), it returns to the step 228 to check the location and the ID of the sub block to be examined next.

If no next sub block is found in the step 328, however, the information interpretation unit 36 sends the interpretation result to the result process unit 40 and the information result provided to the result process unit 40 is then stored in the result storage unit 44 (Step 330). The result process unit 40 generates and transmits to the automatic object information identification system of the present invention the classification information or the management information, the classification information generated if automatic classification information is detected in the interpretation result and the management information created if information/volume information or information to be recorded and managed is detected therein.

At the same time, the volume calculation unit 42 estimates the volume of the object by using the outer coordinates of the sub blocks and the height value of the object obtained by the height sensor, stores and displays the volume information along with the bar code information of the object (Step 334).

If it is found in the step 310 that no identical symbol exists between the start and the stop symbols, the bar code symbology identification unit 200 adjusts the bar code region through the bar code search unit 28 by using the central axis and the height information of the bar code symbology (Step 322). Then, the bar code symbology identification unit 200 decides whether the adjustment is terminated (Step 324). If the examination is not completed, the step 306 is performed again. However, if the examination is completed, the result process unit 40 outputs an error message (Step 320).

If the bar code interpretation information is found to contain errors therein in the step 314, the bar code error detection/correction unit 34 decides whether the found errors belong to a predetermined error correction range (Step 316). If the errors fall within the error correction range, the errors are corrected as follows. First, the check digits or the parity bits are attained correctly on the basis of the values except the start and the stop symbols within the interpretation result. Next, it is checked whether wrong binary characters within the bar code symbology are found by using the check digits. Then, a section obtained by the wrong binary character is set to be a Null to correct the errors (step 317). If there exist errors that cannot be a corrected by the error detection/correction unit 34, the result process unit 40 outputs the error message (Step 320).

Figure 3A:
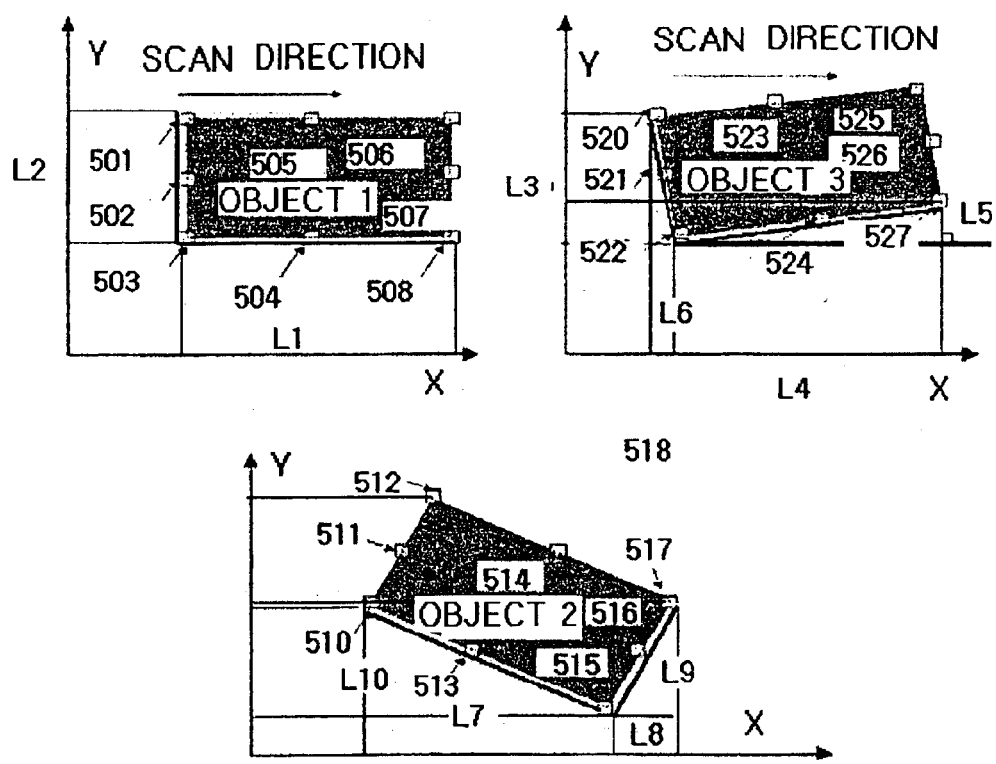
FIGS. 3A and 3B explain characteristics of main coordinate values in examining the sub blocks in accordance with the preferred embodiment of the present invention.
Figure 3B:
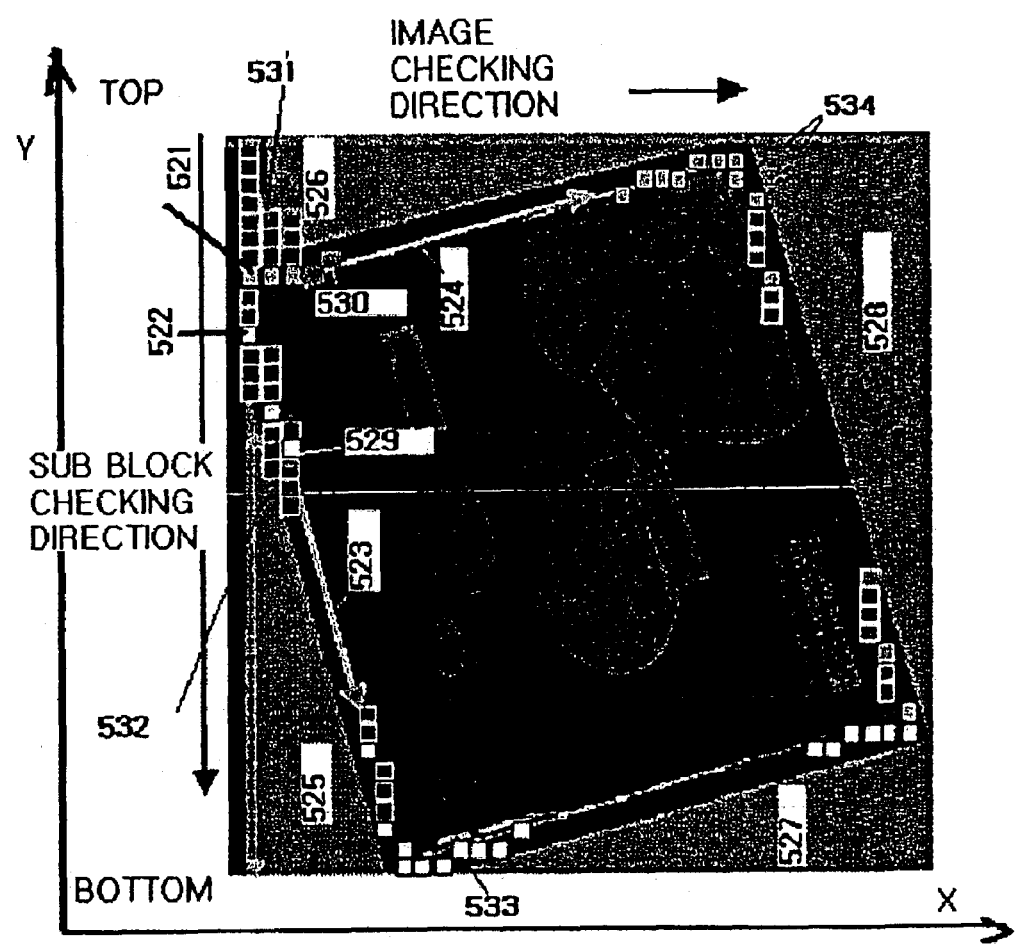

Referring to FIGS. 3A and 3B, there are drawings for explaining characteristics of coordinate values generated during checking sub blocks of an object image in accordance with the preferred embodiment of the present invention.

There are described edge coordinates (501~508, 510~517 and 520~527) of differently positioned objects 1 to 3 as in FIG. 3A and characteristic values represented between the conveyor belt side and the object in the following tables:

TABLE 1

| | | Initial line for checking sub blocks | | | Middle line for checking sub blocks | |
| No. | Top of the sub blocks | Bottom of the sub blocks | Edge | Top of the sub blocks | Bottom of the sub blocks | Edge |
| --- | --- | --- | --- | --- | --- | --- |
| 501 | Black | Black | 0 | Black | Background | 1 |
| 502 | Black | Black | 0 | Background | Background | 0 |
| 503 | Black | Black | 0 | Background | Black | 1 |
| 504 | Background | Black | 1 | Background | Black | 1 |
| 505 | Black | Background | 1 | Black | Background | 1 |
| 506 | Black | Background | 1 | Black | Black | 0 |
| 507 | Background | Background | 0 | Black | Black | 0 |
| 508 | Background | Black | 1 | Black | Black | 0 |

TABLE 2

| No. | Top of the sub blocks | Initial line for checking sub blocks Bottom of the sub blocks | Edge | Top of the sub blocks | Middle line for checking sub blocks Bottom of the sub blocks | Edge |
| --- | --- | --- | --- | --- | --- | --- |
| 510 | Black | Black | 0 | Black | Black/background/black | 2~3 |
| 511 | Black | Black | 0 | Background | Black/background | 1~2 |
| 512 | Black | Black/background | 0~1 | Background | Black/background | 1~2 |
| 513 | Background | Black | 1 | Background | Black | 1 |
| 514 | Black | Background | 1 | Black | Background | 1 |
| 515 | Background | Background | 0 | Black | Background/black | 1~2 |
| 516 | Background | Background | 0 | Background | Black | 1 |
| 517 | Background | Black | 1 | Black | Black | 0 |

TABLE 3

| No. | Top of the sub blocks | Initial line for checking sub blocks Bottom of the sub blocks | Edge | Top of the sub blocks | Middle line for checking sub blocks Bottom of the sub blocks | Edge |
| --- | --- | --- | --- | --- | --- | --- |
| 520 | Black | Black | 0 | Black | Background | 1 |
| 521 | Black | Black | 0 | Background | Background | 0 |
| 522 | Black | Black | 0 | Background | Black | 1 |
| 523 | Black | Background | 1 | Black | Background | 1 |
| 524 | Background | Black | 1 | Background | Black | 1 |
| 525 | Black | Background | 1 | Black | Background | 1 |
| 526 | Background | Background | 0 | Black | Black | 0 |
| 527 | Background | Black | 1 | Black | Black | 0 |

When the characteristic values are obtained as described in the above tables, the objects are distinguished from the conveyor belt. An area for each of the objects can be calculated by using a minimum and a maximum value of outermost coordinates of X and Y-axis of sub blocks having a weight being smaller than or equal to 30. For example, the area of the object 1 is produced by multiplying L1 by L2 based on coordinate values 501 to 508. A distance from 522 to 527 and that from 520 to 522 are calculated by using L4 and L5 and L3 and L6, respectively, to thereby output the area of the object 3. In order to calculate the area of the object 2, a distance from 515 to 517 and that from 510 to 515 need be obtained by using L8 and L9 and L7 and L10, respectively. Each volume of the objects 1 to 3 is produced by multiplying a highest height of the objects, which is measured by a height sensor, by the calculated area of each object.

Referring to FIG. 3B, there illustrated a procedure to check a background side of the object on the basis of information with edges of the object identified in order to check a background side of an object except a conveyer belt region.

By checking the sub blocks in a vertical direction, i.e., a Y-axis values decreasing direction, sub blocks 521 and 522 corresponding to the background side of the object, wherein the sub block 521 having a larger Y-axis value is detected earlier than the sub block 522. In case the Y-axis value of the sub block 521 is near a central axis (½ of a maximum value of Y-axis), a rotation angle of the object is large. If it is near the maximum value of Y-axis, on the other hand, the rotation angle thereof is small. Based on such characteristics, it is possible to select a position where a first sub block in a next region to be checked may be located.

If Y-axis values are decreased from 529 to 525, i.e., 523, Y-axis values of the lower sub blocks are increased from 530 to 534, i.e., 524. Such decreased and increased values 523 and 524 in the Y-axis are calculated by checking sub blocks on three or four vertical lines.

Based on the Y-axis values obtained from the above checking result, sub blocks existing on a next vertical line are checked, wherein the checking is applied up to both a third sub block 531 above a first block and a third sub block 532 below a last block.

While checking other sub blocks as described above, if two sections are found: one is a section 533 where outer coordinate values of sub blocks on more than three vertical lines are decreased; and the other is a section 534 where such coordinate values are decreased and increased again, these two sections can become outer edges of the object, thus separating the conveyor belt side from the side of the object. Accordingly, it is checked whether a bar code symbology exists in a section having the maximum and the minimum Y-axis value except regions 525 to 528.

Figure 4A:
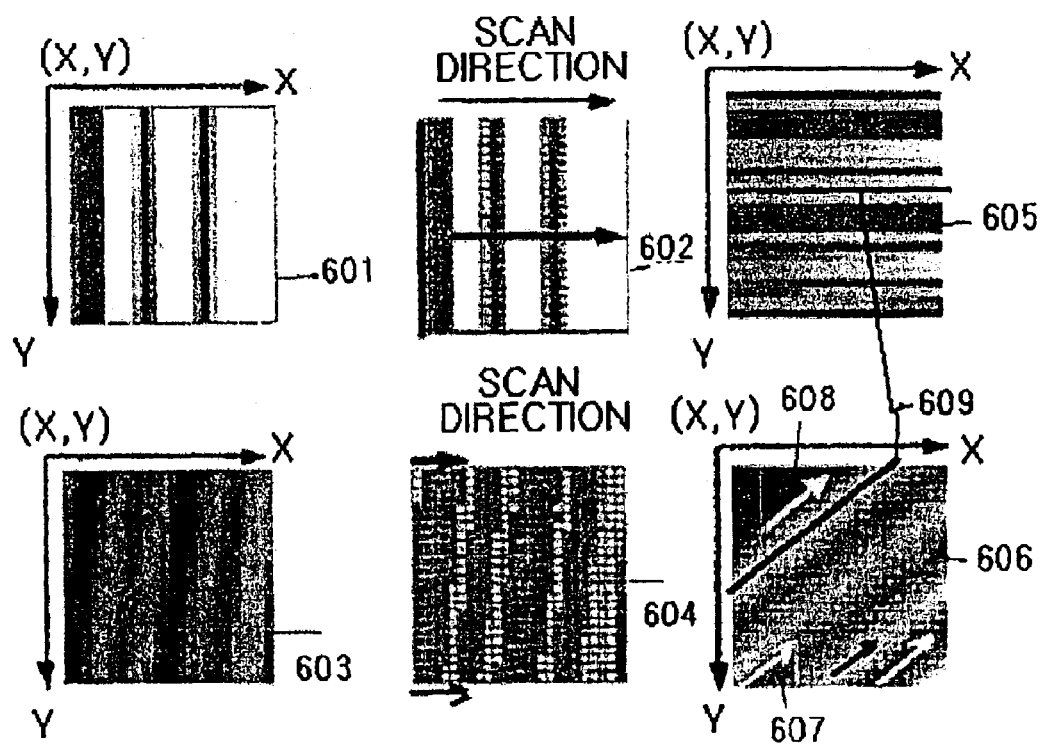
FIGS. 4A to 4C demonstrate a method for setting a weight if there exists a bar code symbology in a sub block in examining the sub blocks in accordance with the preferred embodiment of the present invention.
Figure 4B:
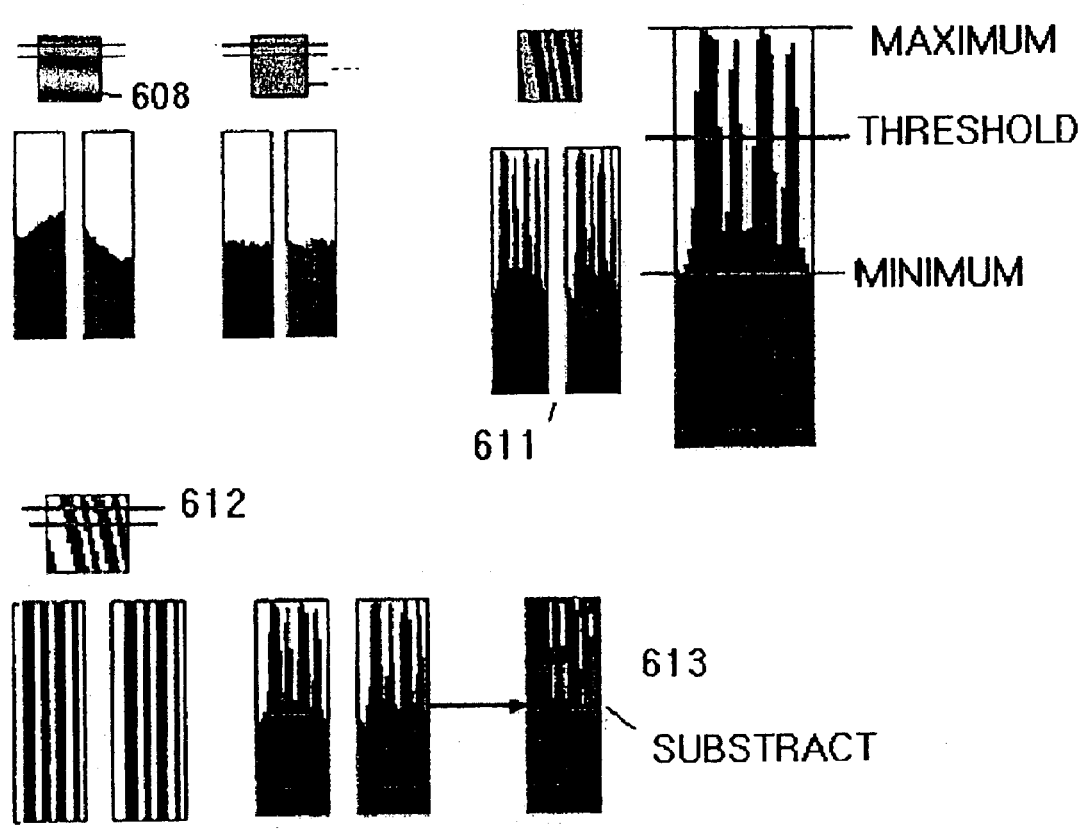
Figure 4C:
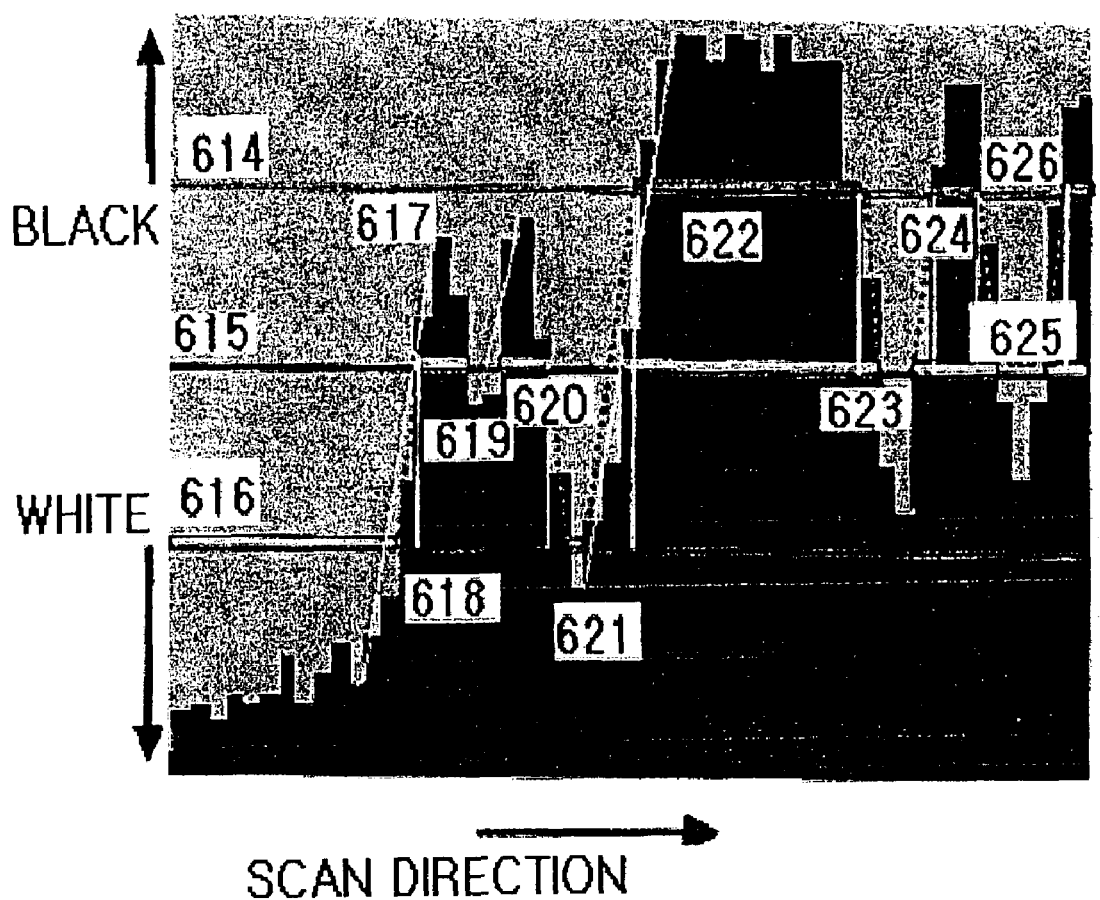

Referring to FIGS. 4A and 4B, there are provided drawings for explaining a method for setting a weight of sub blocks of an object when a symbology is found while the sub blocks are checked in accordance with the preferred embodiment of the present invention.

In FIG. 4A, in case a bar code symbology is found in a sub block during checking the sub block in the vertical direction 601, data is scanned on the basis of one or four lines in a Y-axis direction in the present invention.

If the scanning is performed in an arrow direction as shown in 602, pixels are changed from white to black as well as black to white, so that a difference value between pixels adjacent to the Y-axis becomes small.

Further, in case the bar code symbology exists in a sub block at a certain inclination as shown in 603, a pixel value of the Y-axis is initially detected as white, but later is changed into black. Further, if a first white region between lines is checked as the number of the scanning line increases 604, a size of a last edge section in a lower part of the sub block decreases. Accordingly, an inclined direction and an angle value are calculated by using the change represented in the increment and the decrement, thus setting a weight of the sub block.

If bar code symbologies, which exist orthogonally in the vertical line, are found in a sub block as shown in 605, the number of edges with pixels of the Y-axis changed from white to black and vice versa is increased. Accordingly, in case a bar code symbology is inclined at a certain angle in the present invention, regions excepting a initially found white or black region and a finally found white or block region are checked as the number of the vertical line increases. Then, a difference value represented during performing the checking process is for use in calculating a direction value and an inclined angle value. In this case, a changing amount (difference values) from the white region to the black region and vice versa existing on the center of Y-axis is used in order to minimize the calculation time.

If a bar code symbology is at about +/−45° range as shown in 606, the number of edges generated by a first Y-axis pixel values is less than 10 but not less than 3. In this case, an inclined angle and a direction value of the bar code symbology are obtained on the basis of a size of a region 608 and a changing size of the Y-axis finally found edge section 607, the size of the region 608 being represented before a first edge is generated in Y-axis.

In order to generate information on a ROI, i.e., a region of interest having a possibility of containing a bar code symbology, it is checked whether lines are vertical or inclined at a certain angle, i.e., oblique. Since a difference between adjacent pixels is large in 601 and 602, it is checked whether a difference between the pixels exists on two consecutive vertical lines.

Referring to FIG. 4B, there illustrated an example of a horizontal bar code symbology 608, wherein line information of the bar code symbology is horizontally obtained. In this case, there is a difference in a gray level value between a previous line and a next line. Thus, it is possible to perform a direction information operation of the symbol by calculating an inclination based on the gray level value in a edge surface. A drawing illustrated in a right side of the drawing 608 shows that there is no change between lines in case of the background side of the object.

There illustrated an example of horizontally scanning a bar code symbology 611, wherein one threshold 610 is used to calculate a difference between lines of the symbology and a maximum and a minimum value are shown based on the threshold.

There is shown in 612 a difference between a gray level obtained by scanning lines. A direction value can be calculated based on the difference and a result thereof is shown in 613. In this case, however, an error of the direction value may be large due to a mistaken operation if a central value determining a threshold exists in a narrow symbol, a narrow white region and a narrow symbol.

Figure 5C:
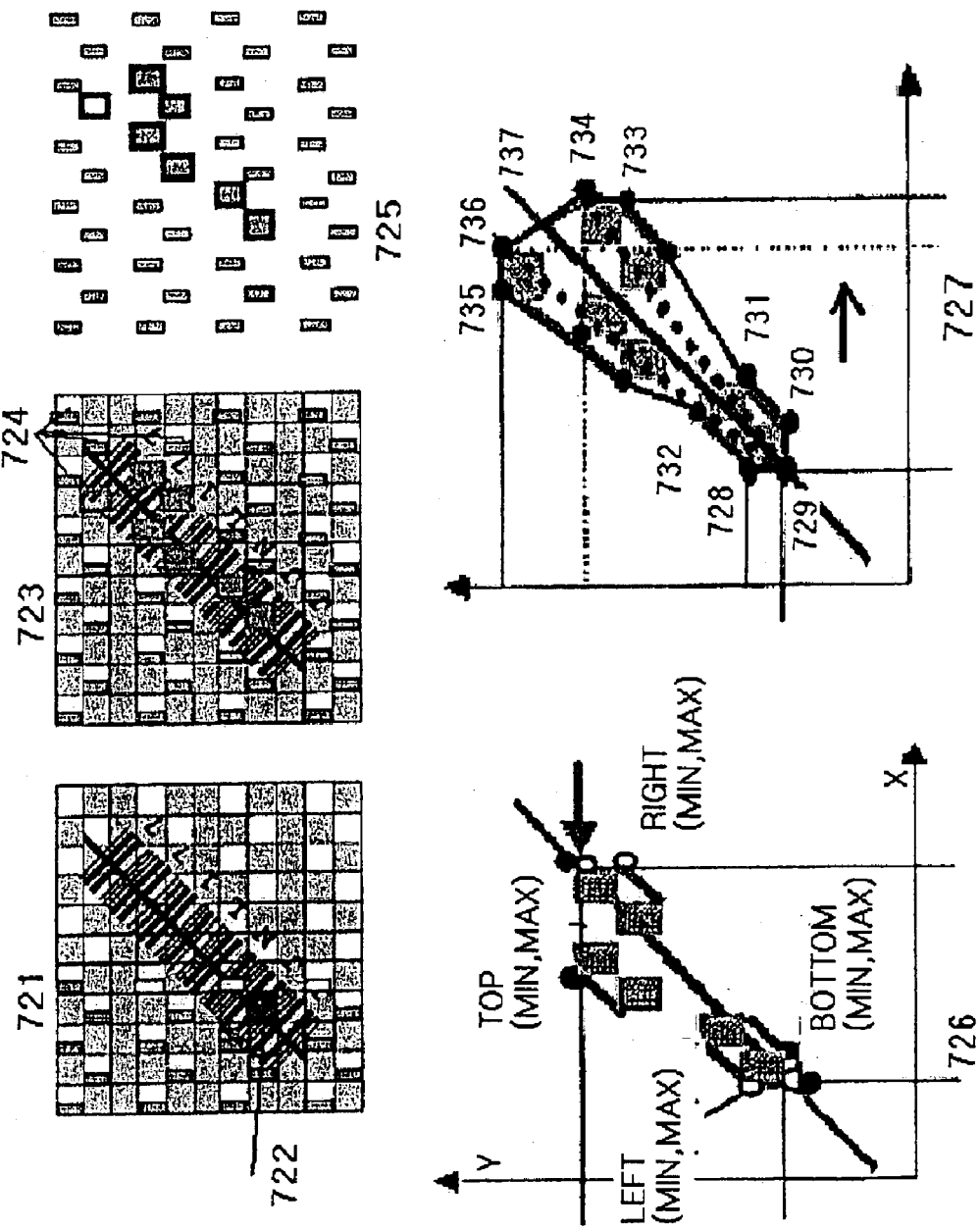

To prevent the generation of the error of the direction value, at least three thresholds 614 to 616 may be applied in the present invention as shown in FIG. 5C. If a black region is distinguished from a white region by using one threshold as shown in 602 and 604, a edge region between bar code symbologies is not accurately identified. Therefore, more than three thresholds (High 614, Mid 615 and Low 616) are used in a black and a white region by considering a deviation of the edge region. According to the three thresholds, a size of a threshold section, an increasing edge and a decreasing edge are determined to calculate a coefficient value of the white and the black region.

Until the background side of the object intersects the threshold 616, the number of pixels in a progressive direction is only calculated, but a changing gray level value is not calculated. Hence, even if gray levels exist between the Low and the Mid threshold 616 and 615, the number of pixels of the levels is only calculated.

Accordingly, if a highest level value is not included in the High 614, the number of pixels of Low 616 (white region) is calculated as a value for indicating a size of a white or a black region by using a Mid 615 counter value. Further, a value for indicating a size of a first black region is calculated by using the number of pixels of 615 and values of 618 to 626 are calculated in the same manner. As a result, it is possible to calculate a thickness of a symbology, a white region value and the number of edges, thus obtaining information on vertical lines of a sub block. Based on gray level values of sub blocks, an existence of a symbology, a direction flag and an inclined angle are determined as shown in FIG. 3, so that a background side of the object can be distinguished from the conveyor belt.

Referring to FIGS. 5A to 5C, there are shown processes for setting the number of sub blocks to be checked among object images, checking sub blocks and searching a bar-code symbology region in accordance with the preferred embodiment of the present invention.

As shown in FIG. 5A, when a bar code symbology exists in a certain area, sub blocks are set as shown in 701 to 704. A bar code region may be extracted only by checking a white region in the sub blocks.

Referring to FIG. 5B, a size of a sub block is determined to be (⅓.5)×(⅓.5), i.e., a minimum and a maximum height of a bar code symbology. Then, sub blocks are checked and outer coordinate values of the sub blocks are used to extract a to-be-read candidate region. A sub block having no bar code symbology can be distinguished (706) by comparing information of three lines on the four pixels basis, so that time for checking a sub block can be minimized. Based on coordinates of a sub block 707 have a high possibility of a bar code symbology, a sub block 709 similar to the sub block 707 also exists in a next vertical line. Lower weights for the sub block existing on a vertical line between sub blocks are obtained than the weight of the previous sub block. Thus, if regions classified as a background side of the object is represented more than twice, both outer coordinates of a ROI for the region having been checked up to the current time and weights of more than 70 or 80 of sub blocks are calculated. Then, a sub block having the lowest weight is detected to adjust the lowest weight and, in order to set a sub block to be a outer coordinate, weights between initial sub blocks and last sub blocks are adjusted as shown in 714, the initial sub blocks and the last sub blocks being on the vertical line with a sub block having a high weight checked.

Meanwhile, there illustrated in 715 an example for showing a process for generating a central line based on outer coordinates of sub blocks. X and Y coordinate value intersected by coordinates 716 and 717 of the sub blocks having the lowest weights are obtained and then, X and Y coordinate value intersected by coordinates 718 and 719 of the sub blocks having the highest weights. Then, the coordinate values obtained from the coordinates 716 and 717 as well as the coordinates 718 and 719 are for use in the centrl axis coordinates.

Referring to FIG. 5C, even though a sub block checking region is reduced to ⅓ (721), a checking process thereof is same as shown in 705 to 711. A central axis line in 726 or 727 can be obtained based on coordinate values of firstly checked sub blocks and lastly checked sub blocks. In case a sub block having a weight of 70 exists as shown in 725 and a next line is checked based on the central axis line as shown in 726, all the bar code symbology information may not be obtained. Thus, a central axis line between an initial section and a last section is obtained as shown in 727. In order to obtain a central axis for a ROI, it makes the sub block having a large weight included between one to three sub blocks. A sub block of the three blocks, the sub block far from the other two sub blocks is excluded and then, grouped, thus obtaining a maximum and a minimum coordinates value based on X and Y-axis. At this time, the maximum and a minimum coordinates value can be obtained in a manner that a right and left central coordinate value is determined by top (min, max), bottom (min, max), right (min, max) and left (min, max) coordinate values of sub blocks. To be specific, a maximum and a minimum value 728 to 730 of an initial coordinate value of a sub block having a large weight is attained. Then, in case a coordinate of 730 is changed into that of 731 in checking a bottom coordinate value, it is compared whether X and Y-axis coordinate value are increased or not. If X and Y-axis coordinate value is increased, coordinates of 731 and 732 are obtained. In 733, the Y-axis value increases (734) while no change in an X-axis is detected. At this time, if no more larger weighted sub blocks are detected, the Y-axis value is set to be a reference value. Upper outer coordinates are generated by comparing whether the X and Y-axis coordinates values are increased (735). At this time, if the X-axis coordinate value increases while no more increase in the Y-axis is detected or if only X-axis coordinate value increases (736) while the Y-axis coordinate value decreases (734), a coordinate value of 736 is set to be a reference value. An intersection point between 734 and 736 based on 729 is found to obtain a straight line, thus generating a central axis.

Figure 6:
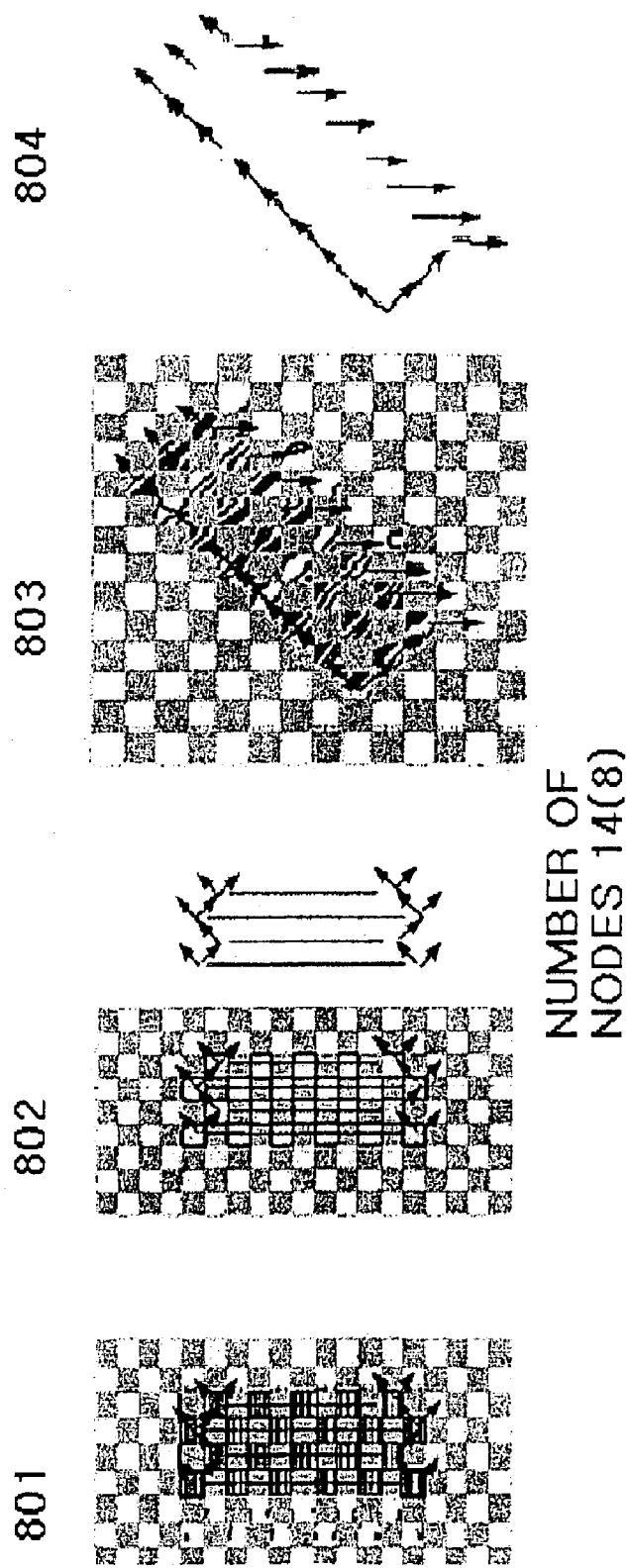
FIG. 6 describes a method for re-adjusting added values of the sub blocks based on the sub block examination result in accordance with the preferred embodiment of the present invention.

Referring to FIG. 6, there is illustrated a case where a weight of a sub block is readjusted by using a check result of sub blocks in an object image in accordance with the preferred embodiment of the present invention.

If a bar code symbology region is vertically detected 801 and 802, it is checked whether a difference between weights of sub blocks on vertical lines is smaller than or equal to 20. To be specific, a first sub block and a last sub block are found and, if a difference between weights of the first and the last sub block is smaller than or equal to 20, every weight of the sub blocks including the first and last sub block is adjusted to +10, thus perform an operation for accurately extracting a bar code region. A drawing in a right side of 802 shows the number of nodes in accordance with the operation.

If a bar code symbology region is inclined at a certain angle as shown in 803 and 804, a weight value of a sub block is readjusted as described above.

In readjusting a weight of a sub block in accordance with the present invention, if the weight thereof is large but there exist no more than three sub blocks having such a large weight, such sub blocks are excluded from ROIs, so that a mistaken ROI is not generated.

Figure 7A:
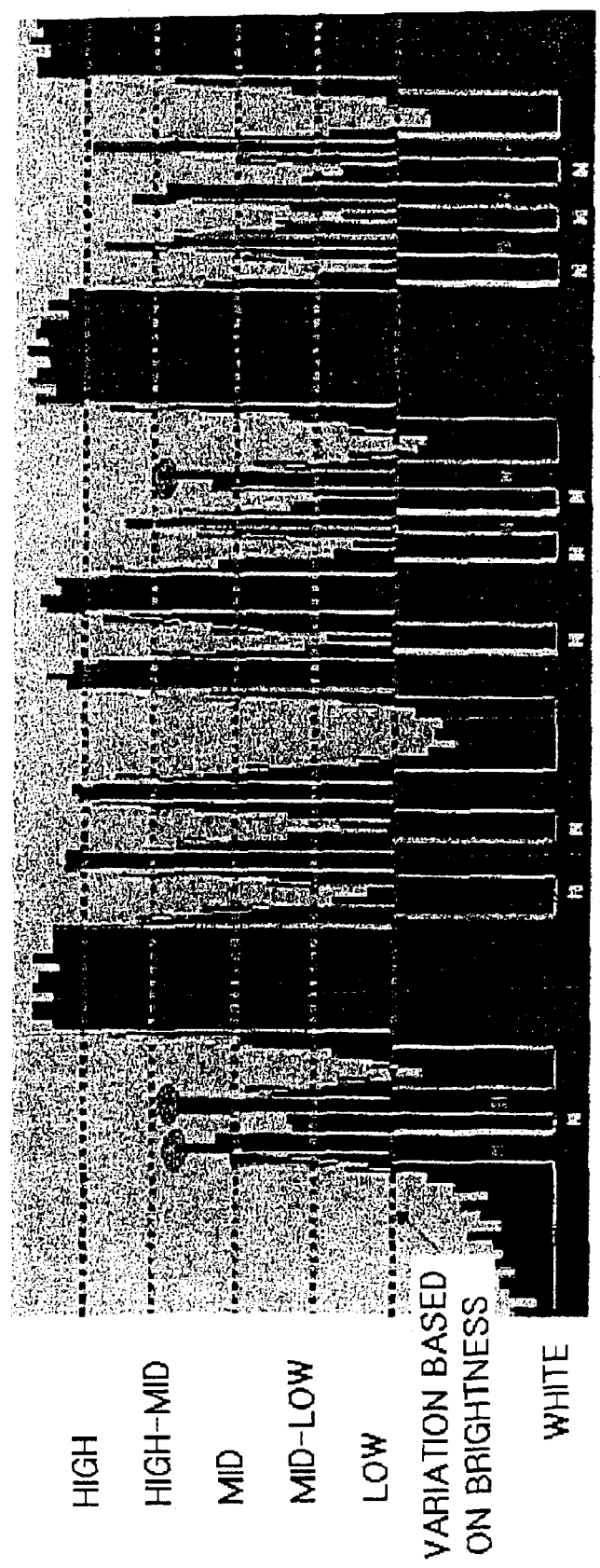
FIGS. 7A and 7B show a method for interpreting pattern information by applying five threshold values based on gray level values in the bar code symbology region in accordance with the preferred embodiment of the present invention.
Figure 7B:
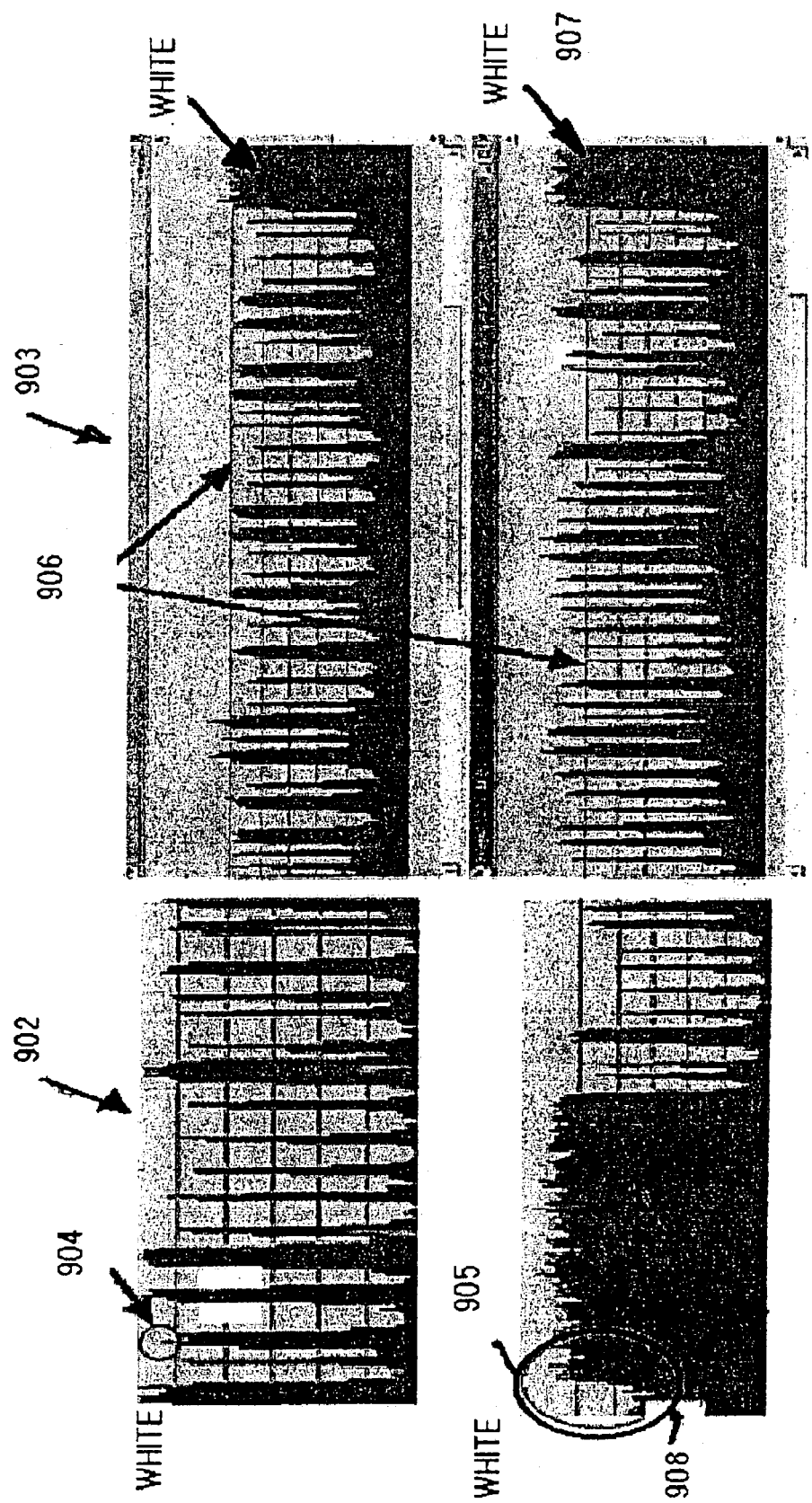

Referring to FIGS. 7A and 7B, there is shown a case where pattern information is analyzed by using five thresholds based on a gray level value of a bar code symbology region in an object image in accordance with the preferred embodiment of the present invention.

An example 901 shown in FIG. 7A employs five thresholds (High, High-Mid, Mid, Mid-Low and Low) in order to minimize an error of a value obtained by checking a central line of a bar code symbology.

A top 15% (controllable during a system setting process) of a gray level value becomes "High" based on an average of a gray level distribution value of a background side of the object. Further, a low −10% of a gray level value of a conveyer belt for transmitting an object becomes "Low", wherein a user may input the top 15% and the low −10%. By using intermediate three thresholds of High-Mid, Mid, and Mid-Low, four sections are generated between the High and the Low value.

If a change, i.e., a level transition, occurs in a threshold in a white region as shown in 904 due to a height of an object or brightness of illumination (902), an error may be generated. In order to avoid the error, sub blocks of containing a gray level being varied from 20 to 40 are to be checked in accordance with the present invention. If a gray level value is varied more than 40 and if it is changed from the Mid-Low to the Mid threshold, values represented before the level value increases are set to be a Low value. The narrowest bar is represented by using only counter values in the Mid region. In this case, an increasing or a decreasing gray level value are below the High-Mid threshold and, if the white region exists between the Mid and the Mid-Low threshold, the counter value of the Mid threshold is employed as show in the 901.

The counter values generated when a gray value increases from Low to Mid-Low and from Mid-Low to Mid in a starting section of 901 are used to thereby reduce an error for both a symbol thickness of the black region and the white region.

Referring to FIG. 7B, there illustrated in 905 a case where a section of which a size is more than ten times of a black region is removed, wherein the black region has the most narrow spaces on both left and right side of a central line. If threshold section is changed irregularly as shown in 908, whether the gray level value is changed from High to Mid is compared with whether the gray level value is changed from Low to Mid. Then, it is determined whether no symbology region is detected, thus removing information on a section having no bar code symbology represented by an error.

If a gray level value of a background side and brightness of lighting are not considered in 903, a top image 906 of 903 is obtained by a gray level value larger than a threshold of a white region and by a gray level value in a normal range of the threshold thereof. In 903, four thresholds except Low threshold are used to obtain a symbol value of the bar code symbology, so that a symbol is set to be a reference value, the symbol being obtained on the basis of the information on a Low threshold and a Mid-Low threshold, the Mid-Low threshold being provided if the gray level value is smaller than a distribution of the background side of the object. Thus, an error due to a small threshold and a large gradient value can be avoided.

Further, the threshold value of the white region is adjusted in 907 by applying both a height of an object and a +15% of a gray level average value of a background side of a sub block. Since such a value of 907 is affected by brightness of illumination, a threshold may be set before object information is identified actually.

Figure 8:
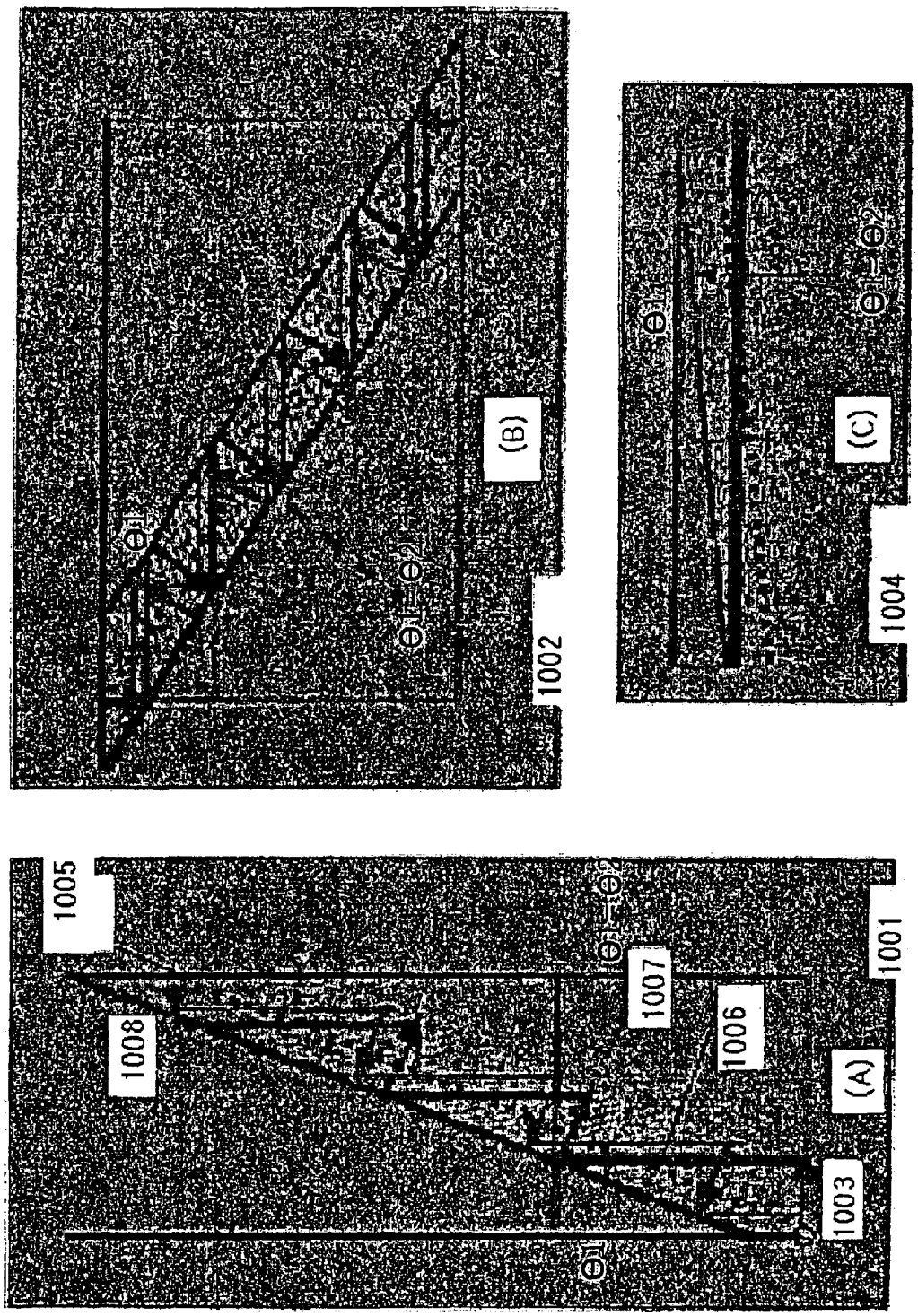
FIG. 8 explains a method for obtaining bar code symbology information based on a central axis line in the bar code symbology region in accordance with the present invention.

Referring to FIG. 8, there is described a process for calculating bar code symbology information based on a central line in a bar code symbology region of an object image in accordance with the preferred embodiment of the present invention. Then, there will now be described a manner for obtaining the bar code symbology information from the bar code symbology region including an angle 1001 close to a vertical line, an angle 1002 close to a horizontal line and an angle 1004 to be checked by a horizontal line.

Since bar code symbologies are inclined at a certain angle larger than $\theta_1$ in 1001 and 1002, information on the symbologies is scanned in zigzags. To be specific, a vertical scanning is performed (1006) by shifting to a height of the symbology from a ½ point of the height of the symbology, the ½ point thereof starting from a longer line of a rectangular shown in 1001 that a central line of the bar code symbology meets. Then, a next vertical scanning is performed from a point 1007 corresponding to 95% of a symbology edge side, 95% thereof being the ratio of the edge side and the height of the symbology, to a point corresponding to 95% of the height of the symbology by a inclination of $\theta_1$ based on a upper horizontal line, thereby obtaining the bar code symbol value.

An angle value is attained based on the height of the bar code symbology (a shorter length of a rectangular) and an entire symbology length (a longer length of the rectangular) by using an angle value of the central axis (dotted line) as shown in 1004. Next, if the angle value has a smaller inclination vertically or horizontally, a horizontal line is generated based on $\theta_1$ to thereby check a corresponding line. Such processes may be applied to a case where an inclination value of a bar code symbology (an inclination of a central line) is less than or equal to 90% of $\theta_1$.

Bar code symbology information is also outputted in an inverse way thereof. For example, coordinate values of a central line and a vertical line are generated based on a last coordinate of a edge surface of a bar code symbology as shown in 1003. Further, after the central axis is moved from 1005 to 1008, a symbol value of a bar code symbology can be obtained by a vertical scanning, thus interpreting information on the bar code symbology.

Figure 9:
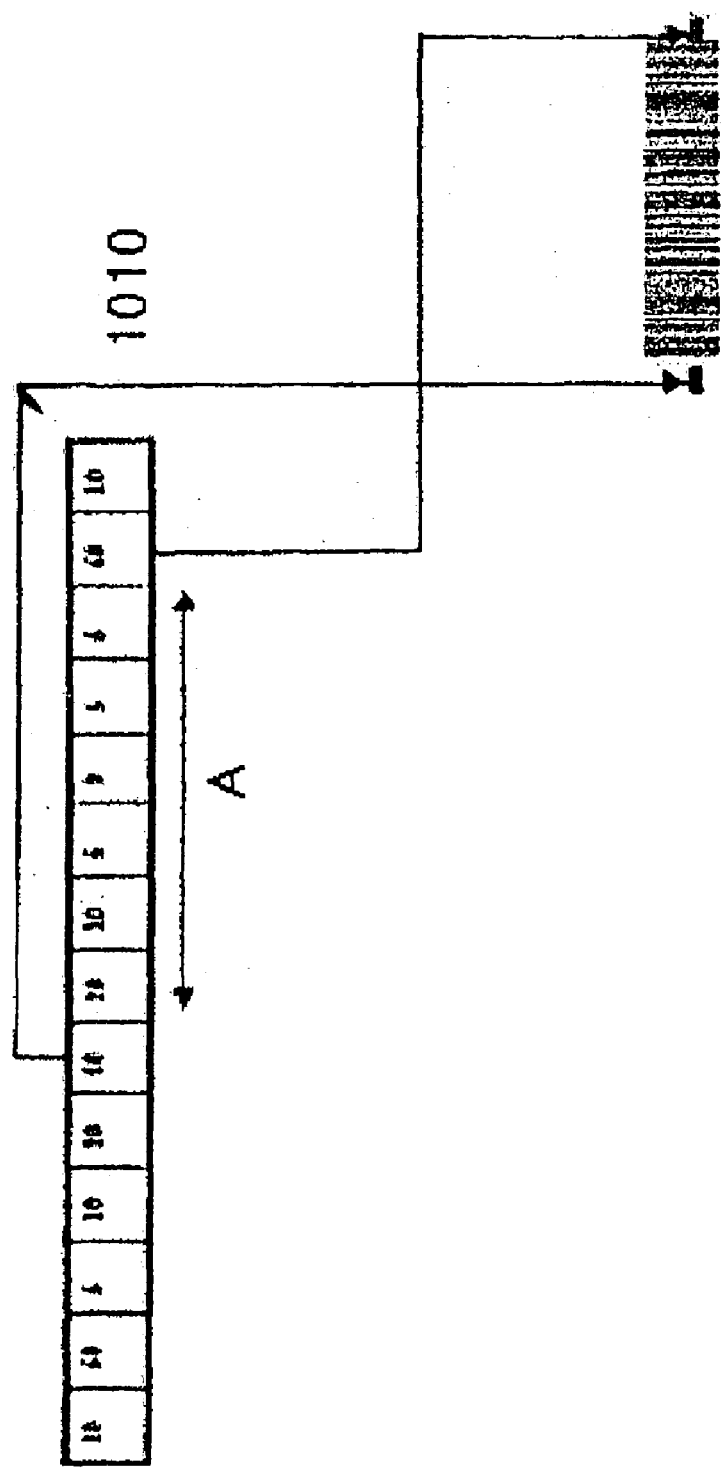
FIG. 9 describes a process for interpreting bar code information by extracting the bar code symbology region from an object image in accordance with the preferred embodiment of the present invention.

Referring to FIG. 9, there is offered an example for outputting bar code symbology information based on a central line and interpreting the information by classifying only the bar code region, the central line being generated in order to interpret bar code symbology information in accordance with the preferred embodiment of the present invention.

If a vertical or horizontal scan line (central axis line) is generated and used as shown in 1010, only symbology information can be extracted from the symbology central axis line based on left and right spaces thereof (a size value of a white region), wherein the number in a symbology information arrangement indicates counts of pixels. Further, "A" (a valid bar code region) in the symbology information arrangement represents an example between 80–60. Still further, a pixel counter larger than a thick bar pixel should be separately stored in the arrangement.

As described above, the present invention provides an improved automatic identification process of object information. Further, the present invention is capable of outputting the region including volume information of an object as well as searching a candidate region for reading a bar code (ROI) at high speed.

Therefore, regardless of a plurality of bar code symbologies and a length variation thereof, bar code symbol information can be accurately obtained and interpreted. As a result, it is possible to obtain information for automatic classification of the object or to-be-recorded and to-be-managed information thereof.

Accordingly, the present invention simplifies processes for inputting the automatic classification information and reading the to-be-recorded information by a bar code reader, thus automatically identifying the object. Further, volume information can be automatically obtained without a separate volume measurement system, so that an information process for carrying and transmitting the object can be also simplified.

While the invention has been shown and described with respect to the preferred embodiment, it will be understood by those skilled in the art that various changes and modifications may be made without departing from the spirit and scope of the invention as defined in the following claims.

What is claimed is:

1. A system for identifying an object having a bar code symbology, the system comprising:

a measurement and input unit for measuring a height and a length of the object and inputting the measured values into the system;

an object image and search region image storage unit for storing an image of the object and images of at least two sub blocks divided from the image of the object and searching a region from the image of the object at certain intervals;

a search region setting unit for setting a size of the sub blocks;

a region of interest having a possibility of containing the bar code symbology (ROI) generation unit for checking the sub blocks to only examine a surface of the object and the possibility of contaning the bar code symbology, setting a weight on every sub block, generating a characteristic value of the sub blocks and setting the ROI;

a bar code symbology identification unit for vertically searching a bar code region from the ROI based on the weight and the characteristic value of the sub blocks, searching a section corresponding to reference information on a predetermined symbology based on a central line of the bar code region and generating a bar code edge region;

an information interpretation unit for interpreting object information corresponding to the bar code edge region; and a result process and storage unit for processing and storing the interpreted object information based on data of pre-stored database if the interpreted object information exists in the pre-stored database and, if otherwise, notifying the search region setting unit of no existence of the object information.

2. The system of claim 1, wherein the measurement unit further includes a height sensor, a start sensor and a stop sensor.

3. The system of claim 1, further comprising a volume calculation unit for calculating a volume of the object in case every sub block is checked in the result process unit.

4. The system of claim 3, wherein the volume calculation unit calculates the volume of the object by using a highest height of the object and a top area of the object obtained based on a coordinate value of an edge sub block having a lowest weight of the object or by using a variation amount of the height and a transmission speed of the object.

5. The system of claim 1, wherein the bar code symbology identification unit further includes a bar code search unit and a bar code edge generation unit.

6. The system of claim 5, wherein the bar code search unit checks a first sub block of the at least two sub blocks in a vertical direction, adjusts a weight of a second sub block of the at least two sub blocks by using a weight and a characteristic value of the first sub block and generates a bar code region by using four coordinate values of a rectangular region, the rectangular region being represented from minimum and maximum values of X and Y-axis of a sub block having a larger weight among the first and the second sub block if the weight of the second sub block is smaller than a predetermined threshold value even though the sub blocks are vertically checked at least twice.

7. The system of claim 6, wherein the bar code edge generation unit generates a central line for a bar code region of the bar code search unit, calculates a section corresponding to a start symbol and a stop symbol in the bar code region by using the symbology reference information and obtains sequentially a sum of a first thickness of the bar code symbology and a first size value of a white region and a sum of a second size value of the white region and a second thickness of the bar code symbology from a location of the start symbol to thereby calculate the bar code edge region.

8. The system of claim 7, wherein a bar code error detection/correction unit inspects whether character values contained in the bar code symbology are correct by using a check digit value based on the values obtained by the bar code edge generation unit except the start and the stop symbols and corrects an error of a wrong character by calculating the check digit value if the inspection result shows that only one bar code symbology character has an error due to coordinate values of a damaged bar code region.

9. The, system of claim 5, wherein the bar code edge generation unit generates a central line for a bar code region of the bar code search unit, calculates a section corresponding to a start symbol and a stop symbol in the bar code region by using the symbology reference information and obtains sequentially a sum of a first thickness of the bar code symbology and a first size value of a white region and a sum of a second size value of the white region and a second thickness of the bar code symbology from, a location of the start symbol to thereby calculate the bar code edge region.

10. The system of claim 9, wherein a bar code error detection/correction unit inspects whether character values contained in the bar code symbology are correct by using a check digit value based on the values obtained by the bar code edge generation unit except the start and the stop symbols and corrects an error of a wrong character by calculating the check digit value if the inspection result shows that only one bar code symbology character has an error due to coordinate values of a damaged bar code region.

11. The system of claim 5, wherein the bar code symbology identification unit further includes a bar code error detection/correction unit.

12. The system of claim 11, wherein a bar code error detection/correction unit inspects whether character values contained in the bar code symbology are correct by using a check digit value based on the values obtained by the bar code edge generation unit except the start and the stop symbols and corrects an error of a wrong character by calculating the check digit value if the inspection result shows that only one bar code symbology character has an error due to coordinate values of a damaged bar code region.

13. A method for identifying an object having a bar code symbology, the method comprising the steps of:

(a) measuring a height and a length of the object and storing an image of the object and images of at least two sub blocks divided from the image of the object;

(b) checking the sub blocks, examining a possibility of contaning the bar code symbology, setting a weight on every sub block, generating a characteristic value of the sub blocks and setting a region of interest having a possibility of containing a bar code symbology (ROI);

(c) searching in a vertical direction a bar code region from the ROI based on the weight and the characteristic value of the sub blocks, searching a section corresponding to reference information on a predetermined symbology based on a central line of the bar code region and generating a bar code edge region;

(d) interpreting object information corresponding to the bar code edge region;

(e) determining whether the interpreted information belongs to information for automatic classification of the object or information to be recorded and managed and verifying whether the image of a sub block of the sub blocks is the last image thereof;

(f) checking a sub block next to the sub block if the image of the sub block is not the last image thereof; and (g) processing and storing a result from the information for automatic classification of the object or the information to be recorded and managed if the image of the sub block is the last image thereof.

14. The method of claim 13, further comprising a step of calculating a volume of the object in case every sub block is checked.

15. The method of claim 13, wherein the volume of the object is obtained by using a highest height of the object and a top area of the object obtained based on a coordinate value of an edge sub block having a lowest weight of the object or by using a variation amount of the height and a transmission speed of the object.

16. The method of claim 13, wherein the step for generating the bar code edge region further including the steps of:

checking a first sub block of the at least two sub blocks in the vertical direction, adjusting a weight of a second sub block of the at least two sub blocks by using a weight and a characteristic value of the first sub block and generating a bar code region by using four coordinate values of a rectangular region, the rectangular region being represented from minimum and maximum values of X and Y-axis of a sub block having a larger weight among the first and the second sub block if the weight of the second sub block is smaller than a predetermined threshold value even though the sub blocks are vertically checked at least twice; and generating a central line for a bar code region, calculating a section corresponding to a start symbol and a stop symbol in the bar code region by using the symbology reference information and obtaining sequentially a sum of a first thickness of the bar code symbology and a first size value of a white region and a sum of a second size value of the white region and a second thickness of the bar code symbology from a location of the start symbol to thereby calculate the bar code edge region.

17. The method of claim 13, wherein the step for generating the bar code edge region further including the steps of:

inspecting whether character values contained in the bar code symbology are correct by using a check digit value based, on the values except the start and the stop symbols and correcting an error of a wrong character by calculating the check digit value if the inspection result shows that only one bar code symbology character has an error due to coordinate values of a damaged bar code region.

18. The method of claim 13, including the steps of:

inspecting whether character values contained in the bar code symbology are correct by using a check digit value based on the values except the start and the stop symbols and correcting an error of a wrong character by calculating the check digit value if the inspection result shows that only one bar code symbology character has an error due to coordinate values of a damaged bar code region.

\* \* \* \* \*

UNITED STATES PATENT AND TRADEMARK OFFICE
CERTIFICATE OF CORRECTION

PATENT NO. : 6,880,758 B2
DATED : April 19, 2005
INVENTOR(S) : Moon Sung Park et al.

It is certified that error appears in the above-identified patent and that said Letters Patent is hereby corrected as shown below:

Column 18,
Line 36, "contaning" should be -- containing --
Line 53, "pre-stored database" should be -- a pre-stored database --

Column 20,
Line 5, "contaning" should be -- containing --

Signed and Sealed this

Twelfth Day of July, 2005

JON W. DUDAS
*Director of the United States Patent and Trademark Office*